United States Patent
Nguyen et al.

(10) Patent No.: US 7,489,419 B2
(45) Date of Patent: Feb. 10, 2009

(54) METHOD AND SYSTEM FOR SPECIFYING HALFTONE SPOT SHAPES

(75) Inventors: Huy A. Nguyen, Hanoi (VN); Mikel J. Stanich, Longmont, CO (US); Gerhard R. Thompson, Wappingers Falls, NY (US); Chai W. Wu, Poughquag, NY (US)

(73) Assignee: Infoprint Solutions Company, LLC, Boulder, CO (US)

( * ) Notice: Subject to any disclaimer, the term of this patent is extended or adjusted under 35 U.S.C. 154(b) by 897 days.

(21) Appl. No.: 10/868,047

(22) Filed: Jun. 15, 2004

(65) Prior Publication Data

US 2005/0275898 A1   Dec. 15, 2005

(51) Int. Cl.
   *H04N 1/40* (2006.01)
(52) U.S. Cl. .................... 358/1.9; 358/448
(58) Field of Classification Search ............. 358/1.9, 358/2.1, 3.03–3.12, 3.16–3.2
   See application file for complete search history.

(56) References Cited

U.S. PATENT DOCUMENTS

| | | | |
|---|---|---|---|
| 5,739,822 A | 4/1998 | Paradine | |
| 5,896,176 A | 4/1999 | Das et al. | |
| 6,020,897 A | 2/2000 | Carlsen et al. | |
| 6,047,080 A | 4/2000 | Chen et al. | |
| 6,067,406 A | 5/2000 | Van Hoof et al. | |
| 6,160,916 A | 12/2000 | Horinchi | |
| 6,198,545 B1 | 3/2001 | Ostromoukhov et al. | |
| 6,373,535 B1 | 4/2002 | Shim et al. | |
| 6,417,853 B1 | 7/2002 | Squires et al. | |
| 6,614,847 B1 | 9/2003 | Das et al. | |

FOREIGN PATENT DOCUMENTS

EP   0425177 A2   5/1991

OTHER PUBLICATIONS

Foster D. Coburn III and Peter McCormick, CorelDRAW 9, the Official Guide, Osburn/McGraw-Hill, Berkely, CA, 1999, pp. 131-140.
Austin Donally, Spot Function Reference, 1998, Austin_Donnelly@yahoo.co.uk.
John Kundert-Gibbs and Peter Lee, Maya 5 Savvy, Sybex, Inc., Alameda, CA, 2004, pp. 104-107.

(Continued)

*Primary Examiner*—Thomas D Lee
*Assistant Examiner*—Stephen M Brinich
(74) *Attorney, Agent, or Firm*—Duft Bornsen & Fishman, LLP

(57) ABSTRACT

A halftone spot function, for determining a shape of a halftone spot as a function of the intensity of an image being printed, is generated by creating one or two line segments forming a part of the shape of the spot function or by creating a number of contour lines that are interpolated to form the function. A halftone spot pattern is generated as a number of supercells, each of which includes a number of halftone spots, each defined within a halftone spot cell by a halftone spot function, with the supercell being defined to include a number of device pixels, each of which is fully inked of left without ink, a number of spot cells in each direction, and offset distance establishing angles of the lines dividing the spot cells from one another.

36 Claims, 13 Drawing Sheets

OTHER PUBLICATIONS

Eric Lengyel, Mathematics for 3D Game Programming & Computer Graphics, Second Edition, Charles River Media, 2004, Ch 15, pp. 453-497.

George Omura, Mastering AutoCAD LT For Windows 95, Sybex, Inc., Alameda, CA, 1996, pp. 502-516.

Stephen Romaniello, Photoshop CS Savvy, Sybex, Inc., Alameda, CA, 2004, pp. 4-8, 414-417.

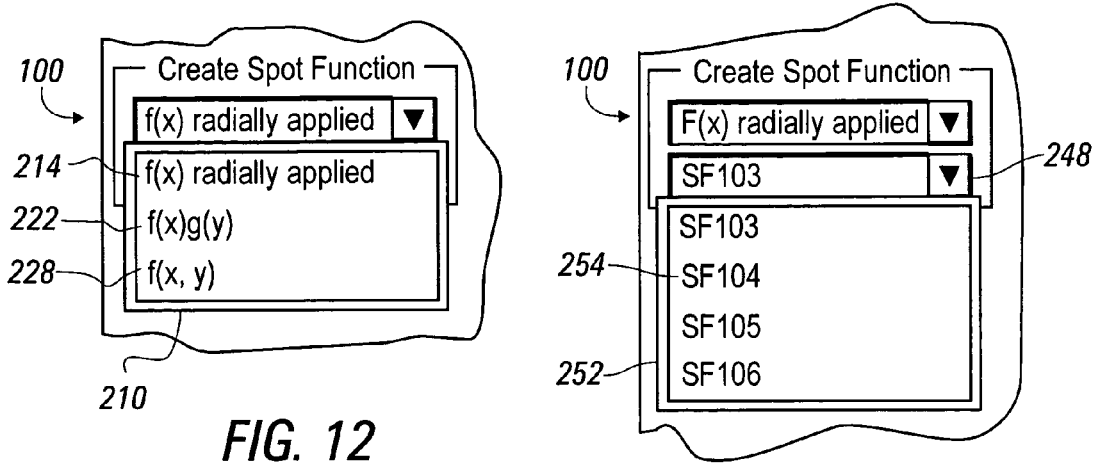
FIG. 12
FIG. 14
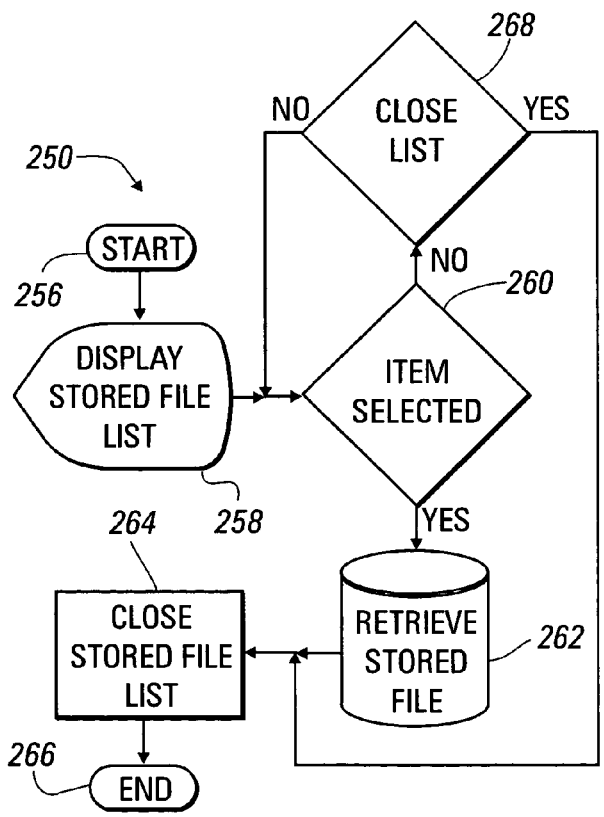
FIG. 13
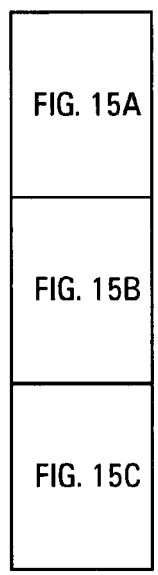
FIG. 15

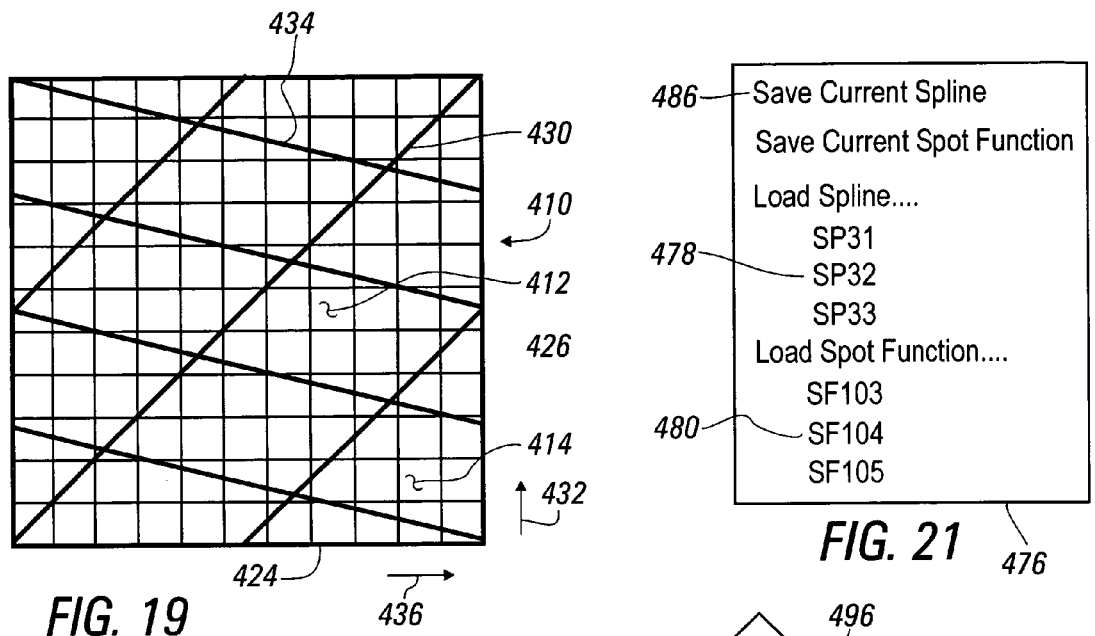
FIG. 19
FIG. 21
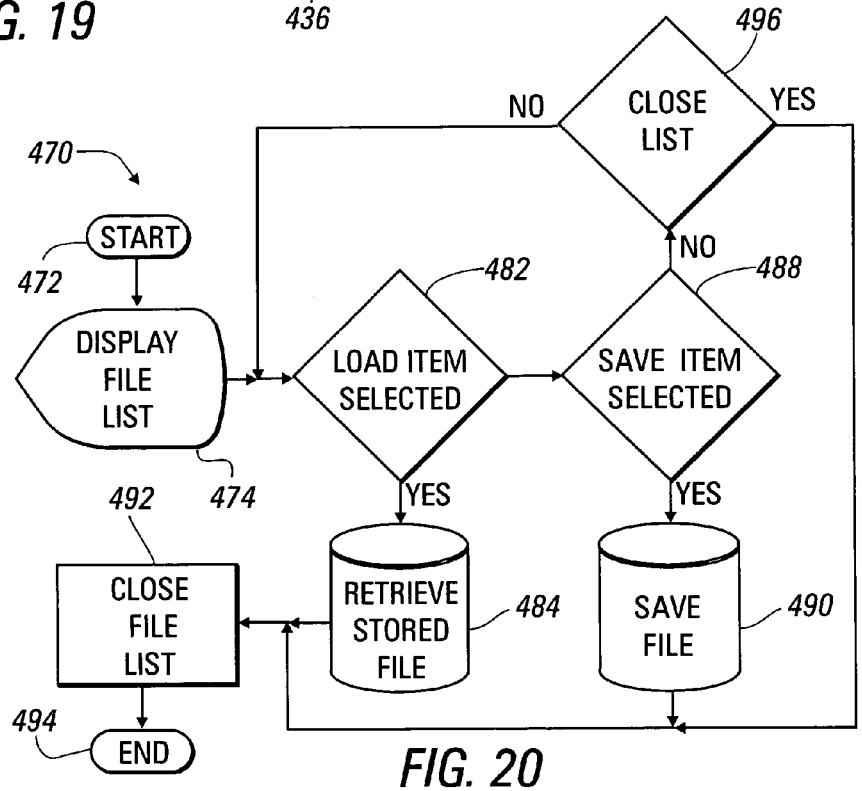
FIG. 20

METHOD AND SYSTEM FOR SPECIFYING HALFTONE SPOT SHAPES

BACKGROUND OF THE INVENTION

1. Field of the Invention

This invention relates to the generation of halftone patterns for printing and graphical displays and, more particularly, to providing a user interface for describing how the spots forming such halftone patterns are to be formed as a function of the overall density of an area to be printed or displayed.

2. Summary of the Background Art

Halftone patterns are used to convert continuous tone gray and color images into binary patterns to produce many different kinds of printed images or graphics. This conversion step is necessary because most printing processes are binary in nature, locally producing only an area having no ink or an area completely covered by a layer of ink. Such printing processes include mass production processes, such as letterpress printing and offset printing, as well as computer output printing.

The idea of producing images from black, white, and colored spots is not new, being well represented in the form of mosaic tile images formed in the first century BC in Pompeii. In the last two decades of the nineteenth century, a group of artists known as the pointillists produced paintings formed by arrays of colored dots, which were seen as realistic scenes when viewed from sufficient distances. These artists, notably Georges Seurat and Paul Signac, studied color theory to determine how one color affects other colors around it, as seen by the human eye, and applied paint to canvas in units, or little dots. Their work influenced the development of modern color printing processes, which use four colors—cyan, yellow, magenta, and black—along with the white background of paper before printing, to represent full color images. Because of the binary nature of most printing processes used for the printing of each of these colors, a separate halftone pattern is usually used to form an image in each color.

Printers operating with computer systems to produce individual copies of documents are typically either electrophotographic devices or ink jet devices. The electrophotographic devices tone electrostatic images on a photoconductive surface after the images have been formed by electrically charging the surface and by discharging areas to form the image, typically with light from a laser driven by a signal derived from the image to be printed. Toner from the photoconductive surface is then transferred to the surface of the paper and fused on the paper with heat. While electrophotographic printing has some ability to print continuous tones, much better results are typically obtained when halftone images are printed.

A computer output printer generally prints dots on paper corresponding to information stored in a pixel map within the computer system, with data being transmitted from the computer system to the printer according to a PDL (page description language), such as POSTSCRIPT (a registered trademark of Adobe Systems, Inc.), which is independent of the type of printer, or, alternately according to a PCL (Printer Control Language), such as a version of a language developed by Hewlett Packard, that is dependent on the type of printer. For example, an image is represented and stored in a page description format as a PDL file including one or more objects to be printed. The printer then interprets the objects within the PDL file, rendering the data as a pixel map stored within a frame buffer.

For halftone printing of a grayscale image using an electrophotographic printer, locations corresponding to the area in which an image can be printed are divided into a number of halftone cells, each of which includes a number of device pixels that can be individually printed as dark areas or left white by the printer. For each device pixel, the intensity of a corresponding area of the original image is compared with a threshold level, with the printer then being conditioned to print the pixel area dark if the threshold value exceeds a number representing the intensity of the corresponding area of the original image and otherwise to leave the pixel area white. The number representing the intensity of the corresponding area of the original image is derived from the gray level of the original image, being, for example, a number between zero and 255 in an 8-bit system where white is 255. For each device pixel, the threshold value is derived from a threshold array of values representing the spot pattern of the halftone.

For halftone printing of a color image using an electrophotographic printer, the process described above for a grayscale image is repeated for each of several tonal images formed when the color image is separated into several colors. Typically, separate images of cyan, yellow, magenta, and black are used in a four-color printing process. The halftone patterns formed for these colors are typically rotated with respect to one another.

The halftone patterns used in electrophotographic printing are typically formed on a constant line frequency grid having a fixed spacing between adjacent individual dots in both horizontal and vertical directions. The size of an individual dot, and its shape, depend on the local optical density, when viewed from a suitable distance, of the gray or color image to be printed. On the other hand, ink jet devices typically produce stochastic, or frequency modulated halftone patterns, with small drops of ink. The halftone patterns used in electrophotographic printing are typically composed of spots that vary in shape as well as size with changes in density. Since characteristics of the printing process affect the ways in which a halftone pattern is actually printed, it is desirable to consider these characteristics in developing the specifications of halftone patterns for a particular type of printer. While spots below a certain size do not print reliably spots large enough to print exhibit a phenomenon known as dot gain, which enlarges the spots to some degree, especially effecting relatively small spot sizes. As spots increase in size, corresponding to images of increasing overall darkness, they begin to touch, with toner being deposited additionally in the narrowing areas adjacent the lines along which the spots touch. This results in a phenomenon known as tonal jump, with the density of the printed pattern rapidly changing in response to a gradual change in the density of the image being reproduced. As the spots increase in size to nearly fill the paper, the small gaps among adjacent spots reach a point in which they are filled with toner, as a result of a phenomenon known as plugging.

FIG. 1 is an enlarged view of a Euclidean halftone pattern, showing spot shapes formed to achieve densities, in terms of an intensity defined as the ratio of the white paper area remaining after printing to total area, varying from 0 at a left end to 1.0 at a right end. As this intensity is decreased from 1.0 to 0.5, the spots are changed from small round dots 2 to larger round dots 4, to diamonds 5. As the intensity is further decreased from 0.5 to 0, the pattern is formed by spaces between adjacent spots, with these spaces being formed as increasingly small round areas. This pattern provided good results, since the small areas, whether black or white, are all round, minimizing the dot gain of the black areas and the problems of plugging the white areas. A tonal jump occurs as the adjacent diamond-shaped spots touch at an intensity of 0.5. The advantages of this type of pattern make it the most widely used halftone pattern today.

U.S. Pat. No. 6,198,545 describes a method for generating halftone patterns including screen elements with sophisticated spot shapes such as artistic shapes, microletters, and ideograms. The method can be used to generate screen elements having spots made of artistic shapes evolving with increasing levels of density. For generating screen elements at consecutive intensity levels, intermediate contours that bound the black and white parts of each screen element are obtained by interpolating between fixed predefined contours. The process can be used to generate discrete subscreen elements having geometries varying from one subscreen spot to another for the same density level. Some subscreen dot variations may be used to avoid counterfeiting by photocopying machine and digital scanners, making the process useful for printing banknotes, postage stamps, or valuable papers. The two fixed predefined contours are provided as inputs during the process of designing the halftone pattern, being described, for example, as a sequence of curve segments represented by spline functions, such as functions of third order Bezier curves, in a method commonly used by interactive curve drawing software packages.

While a line segment may be provided as an input to a computer system by providing the values of parameters within an equation defining the line segments in two- or three-dimensional space, together with limits establishing each end of the segment, this method is cumbersome and not intuitive for use in the design process. Therefore, a number of graphical methods have been developed for providing user inputs describing and modifying such line segments. One of these methods involves the treatment of the line segment as a spline having a number of control vertices, each of which is a point in two- or three-dimensional space. Taken together, the control vertices define the beginning and end of the line segment and its shape by defining the parameters of the mathematical equation of the line segment. A straight line segment is defined by only two control vertices, which are placed at its ends. In general, a control vertex establishes each end of a curved line segment, with one of more additional control vertices, displaced away from the line segment, establishing the shape of the line segment between its ends according to previously established mathematical relationships.

Thus, data defining a line segment as a spline is provided by a user establishing the locations of the various control vertices by typing their coordinates or by selecting their position using a pointing device, such as a mouse. The shape of the line segment may then be further modified by moving the control vertices, or by adding or deleting control vertices. This method is used, for example, in computer assisted drafting with AUTOCAD@, and in the generation of animation objects for film production in MAYA®. The processing of data to evaluate spline functions is further discussed in European Patent Application 0425177 A2, The mathematical interpolation associated with the generation of parameters for splines may further be used in a convergence adjusting apparatus for a projection image display device, as described in U.S. Pat. No. 6,373,535.

Another method for creating a surface of a three-dimensional model is described in U.S. Pat. No. 5,739,822, with the method being performed in a system characterized by identification means for identifying data representing a plurality of lines forming a first closed loop consisting of edges meeting at nodes, and for retrieving such data from a storage device, and processing means for generating data defining a series of additional loops to represent a candidate surface bound by the first closed loop. Additionally, the processing means is adapted to receive data representing a line defined by the user via the input means, which subdivides the first closed loop into a plurality of new closed loops, and then to edit the candidate surface by generating a further series of closed loops for each new closed loop.

A method for automatically calibrating the operation of an output device, such as a printer, based on the output mode of the device, is described in U.S. Pat. No. 6,067,406, with the output mode being characterized by user-selectable settings, such as paper type and ink type. Apart from screen characteristics, such as screen ruling, frequency, and angle, a calibration curve are communicated via the page description language, such as POSTSCRIPT® Level 2, for each color component. Sets of calibration curves are prepared for specific types of rendering, being referenced by name. Through this name identification and through naming conventions based upon the output mode or screening parameters, calibration changes are introduced quickly and consistently.

What is needed is a method for generating a halftone spot function quickly, from an input describing its cross-sectional shape along one or two axes. Additionally, what is needed is an efficient method for generating a halftone pattern using tileable supercells, each including a number of halftone cells that are not themselves tileable horizontally and vertically because of the angles at which they are skewed and inclined.

SUMMARY OF THE INVENTION

According to one aspect of the invention, a computer implemented method is provided for generating a three dimensional halftone spot function having values representing a contour of a halftone spot within a halftone spot cell as a function of image intensity information from an image being printed in an area corresponding to the halftone spot cell. The method includes receiving data describing a first line segment extending along a plane, generating a three dimensional function to extend within the halftone spot cell with a portion of a line extending along the three dimensional three dimensional function in a first direction through a center of the halftone spot cell being shaped as the first line segment; and storing the three dimensional function as a portion of the halftone spot function.

In one version of the invention, the three-dimensional function is generated as a surface of revolution about an axis representing the center of the halftone cell. A surface of revolution about an axis is understood to be a surface along which a line extending radially in any direction from the axis is identically shaped, in this case as the first line segment.

In another version of the invention, the method additionally includes receiving data describing a second line segment. The three dimensional function is generated so that a first line extending along a first axis of the three dimensional function, through a center of the halftone spot cell in a first direction has a shape of the first line segment, so that a second line extending along a second axis of the three dimensional function, through the center of the halftone spot cell in a second direction, at an angle respect to the first direction, has a shape of the second line segment, and so that each point of the three dimensional function offset from the second axis through a first distance and offset from the first axis through a second distance has a value of a product of the value of the first line at the second distance from the center of the halftone spot cell and the value of the second line at the first distance from the center of the halftone spot cell. In this manner each section through the function, where the section is parallel to the axis, has the same shape except scaled by a constant.

According to another aspect of the invention, the method for generating a halftone spot function includes performing the following steps a) through d) for a plurality of contour lines: a) receiving inputs describing locations of a plurality of control points along a plot area representing the halftone spot function; b) receiving an input describing a location of an area outside the plot area to end the process of receiving inputs describing locations of a plurality of control points; c) generating a line segment by interpolating among the plurality of control points; and d) receiving an input describing an intensity value to be associated with a contour line including the line segment. A three dimensional function is then generated as a portion of the three dimensional spot function to extend within the halftone spot area by interpolating among the plurality of contour lines.

According to an additional aspect of the invention, a computer implemented method is provided for generating a halftone pattern to be printed by a printer producing a plurality of alternately inked and blank device pixels. The method determines contours of halftone spots within a plurality of halftone spot cells in a halftone supercell as a function of image intensity information from an image being printed in an area corresponding to the halftone supercell. The halftone supercell is tileable for repeated adjacent placement in a first direction and in a second direction, perpendicular to the first direction. The method includes receiving data describing a three dimensional halftone spot function having values representing a contour of a halftone spot within each of the halftone spot cells as a function of image intensity information from the image being printed in an area corresponding to the halftone spot cell; receiving data describing a number of the device pixels extending adjacent to one another within the halftone supercell in the first direction and a number of the device pixels extending adjacent to one another within the halftone supercell in the second direction; receiving data describing a number of the halftone spot cells extending adjacent to one another within the halftone supercell in the first direction and a number of the halftone spot cells extending adjacent to one another within the halftone supercell in the second direction; receiving data describing a first offset distance through which lines separating adjacent halftone spot cells are inclined between first and second parallel edges of the halftone supercell and a second offset distance through which lines separating adjacent halftone spot cells are inclined between third and fourth edges, perpendicular to the first and second edges, of the halftone supercell; and generating halftone data placing the halftone spot function within each of the halftone spot cells in the halftone supercell.

BRIEF DESCRIPTION OF THE FIGURES

FIG. 12 is a fragmentary view of the display screen of FIG. 6, showing a drop down list of methods to be selected for creating a spot function during execution of the create spot function subroutine of FIG. 11;

FIG. 13 is a flow chart showing processes occurring during execution of a retrieve spot function subroutine within the halftone spot design routine of FIG. 7;

FIG. 14 is a fragmentary view of the display screen of FIG. 6, showing a drop down list of spot functions to be retrieved during execution of the retrieve spot function subroutine of FIG. 13;

FIG. 19 is graphical view of a rectangular halftone supercell including a number of halftone spot cells;

FIG. 20 is a flow chart of processes occurring during execution of a file subroutine within the halftone spot design routine of FIG. 7; and FIG. 21 is a fragmentary view of the display screen of FIG. 6, showing a drop down menu listing save and retrieve operations to be selected during execution of the file subroutine of FIG. 20.

DETAILED DESCRIPTION OF THE INVENTION

Figure 1:
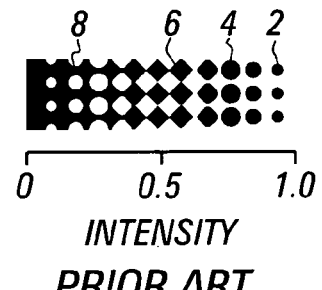
FIG. 1 is an enlarged view of a Euclidean halftone pattern, showing spot patterns formed to achieve variations in intensities.
Figure 2:
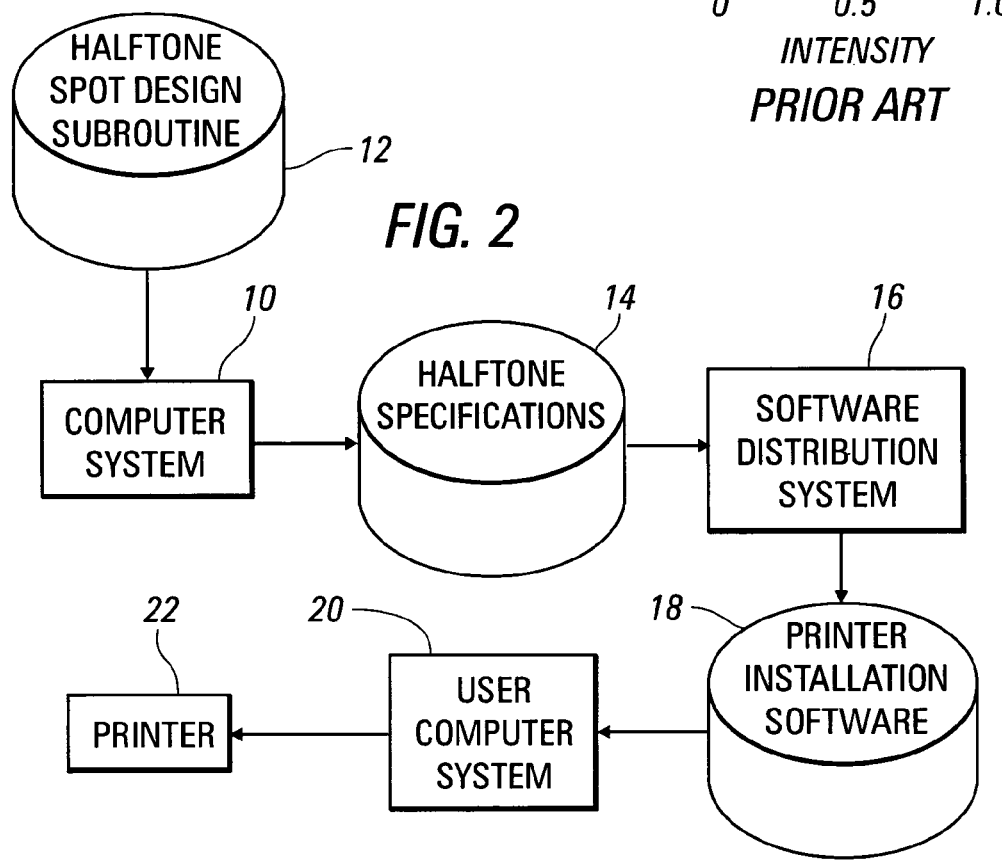
FIG. 2 is a flow chart showing a flow of data within a system using the method of the invention in support of the development and use of an electrophotographic printer.

FIG. 2 is a flow chart showing the flow of data within a system using the method of the invention in support of the development and use of an electrophotographic printer. The system includes a computer system 10 configured for designing halftone spot shapes using a halftone spot design routine 12 that is loaded into the design computer system 10 to facilitate the specification of properties of halftone spots. Using this routine 12, halftone specifications 14 are developed to be provided to a software distribution system 16. The software distribution system 16 distributes printer installation software 18, including the halftone specifications 14, for use within a user computer system 20 connected to an electrophotographic printer 22.

The printer installation software 18 may be distributed in the form of a removable medium, such as a compact disk, having computer readable instructions, which is supplied with the printer 22. Alternately, the printer installation software 18 may be transmitted to the user computer system 20 in the form of a computer data signal embodied in a carrier wave. Alternately, the printer installation software 18 may be installed as a portion of an operating system stored within the user computer system 20, to be loaded for use when the printer 22 is installed.

Figure 3:
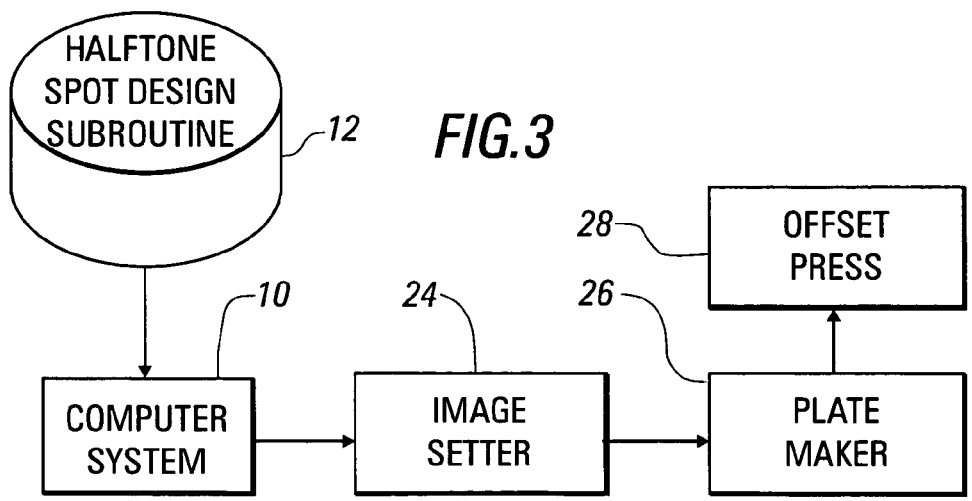
FIG. 3 is a flow chart showing a flow of data within a system using the method of the invention to support offset printing.

FIG. 3 is a flow chart showing the flow of data within a system using the method of the invention to support offset printing. The system includes the computer system 10 configured for designing halftone spot shapes using the halftone spot design routine 12. The computer system 10 drives an image setter 24, which may be a high-resolution electrophotographic printer, to make output documents having images including halftone patterns for offset printing. These output documents are transferred to a plate maker 26, which makes offset printing plates from the, generally by a photographic process. These plates are then used for offset printing within an offset press 28.

Figure 4:
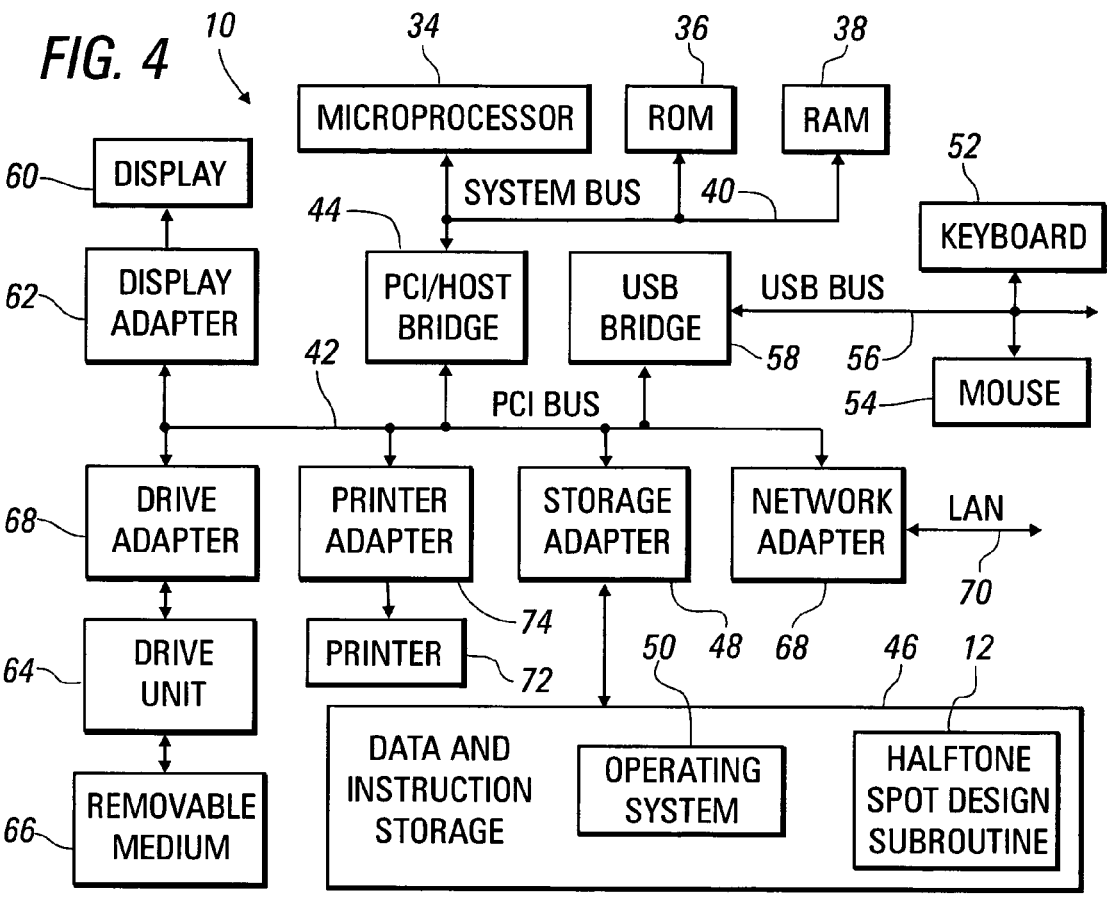
FIG. 4 is a block diagram of a computer system operating in accordance with the invention for specifying halftone pattern spot shapes within the systems of FIGS. 2 and 3.

FIG. 4 is a block diagram of the computer system 10 operating in accordance with the invention for specifying halftone pattern spot shapes. The computer system 10 includes a microprocessor 34 executing program instructions stored in a read-only memory (ROM) 36 and additionally in a random-access memory (RAM) 38, both of which are connected to the microprocessor 34 through a system bus 40. The microprocessor 34 is also connected to a Peripheral Component Interconnect (PCI) bus 42 through a PCI/host bridge circuit 44.

The computer system 10 also includes data and instruction storage 46, connected to the PCI bus 42 through a storage adapter 48. For example, if the data and instruction storage 46 is a hard disk, the storage adapter 48 is a suitable hard disk adapter. Program instructions from the data and instruction storage are typically loaded into RAM 38 for execution of a program within the microprocessor 32. Data and instruction storage 46 stores an operating system 50, which controls the allocation and usage of hardware resources within the computer system 10, and the halftone spot design routine 12, which has been loaded to facilitate the specification of halftone spot shapes in accordance with the invention.

User inputs to the computer system 10 are provided through a keyboard 52 and a mouse 54, which are connected to the PCI bus 42 through a USB bus 56 and a USB bridge circuit 58. An interface to the user from the computer system 10 is provided through a display screen 60, which is attached to the PCI bus 42 through a display adapter circuit 62. The computer system 10 further includes a drive unit 64, accepting a computer readable medium 66 to read data therefrom. The drive unit 64 is connected to the PCI bus 42 through a drive adapter 68. For example, the computer readable medium 66 may be a compact disk or a rewritable compact disk, with the drive unit 60 being a compatible device. Preferably, the computer system 10 also includes a network adapter circuit 68, for connection to a LAN 70 (local area network). As shown in the example of FIG. 3, the computer system 10 may also include a printer 72, connected to the PCI bus 42 through a printer adapter circuit 74.

The halftone spot design routine 12 may be installed within the computer system 10, being loaded into data and instruction storage 46, in the form of computer readable instructions embodied on the computer readable medium 66. Alternately, the halftone spot design routine 12 may be installed within the computer system 10 in the form of computer usable instructions embodied in a computer data signal on a carrier wave transmitted along the LAN 70.

If the computer system 10 is used within a system supporting the design and use of an electrophotographic printer 22, as described above in reference to FIG. 2, the halftone specifications 14 may be recorded as computer readable data on the removable medium 66, or as computer usable data embodied in a computer data signal transmitted along the LAN 70.

If the computer system 10 is used within a system supporting offset printing, as described above in reference to FIG. 3, the image setter 24 may be the printer 72; otherwise a conventional printer may be used as the printer 72, with the image setter 24 being connected to the computer system 10 through the LAN 70.

Figure 5:
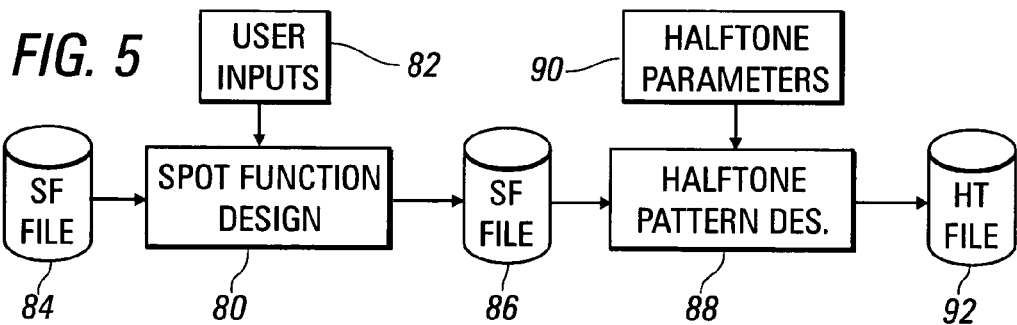
FIG. 5 is a flow chart showing a flow of data during execution of the halftone spot design routine within the computer system of FIG. 4.

FIG. 5 is a flow chart showing a flow of data during execution of the halftone spot design routine 12 within the computer system 10. In the spot function design process 80, user inputs 82 are used to define the size and shape of a halftone spot within a halftone cell as a function of the intensity to be achieved, with the intensity being defined as the ratio of the unprinted area to the total area of the halftone cell. A pre-existing spot function file 84 may be provided as an input to this process 80, for modification within the process, with such a file 84 defining the shape of halftone spot within a halftone cell. For example, this pre-existing spot function file is in a format specifying one or more equations for three-dimensional surfaces defining the shape of the spot within the halftone cell as a function of intensity. Alternately, the spot function file is in a bitmap format, such as a JPEG format, with the halftone cell being divided into pixels having grayscale or tonal levels, each of which represents a of intensity below which ink is to be printed within the portion of the halftone cell represented by the pixel. For example, in an 8-bit system, 256 different levels of intensity can be represented in this way.

The spot function design process 80 produces a spot function specification file 86, which, according to a preferred version of the invention, provides parameters describing one or more equations defining the shape of the spot within a halftone cell as a function of intensity. This spot function specification file 86 is provided as an input to a halftone pattern design process 88, along with halftone parameters 90 defining, for example, the size of device pixels of the printer being used as an output device, and the desired grid spacing and angle for the halftone pattern. The halftone design process 88 arranges the halftone cells in a tileable pattern, which can be arranged in a rectangular array, producing a halftone specification file 92.

Figure 6:
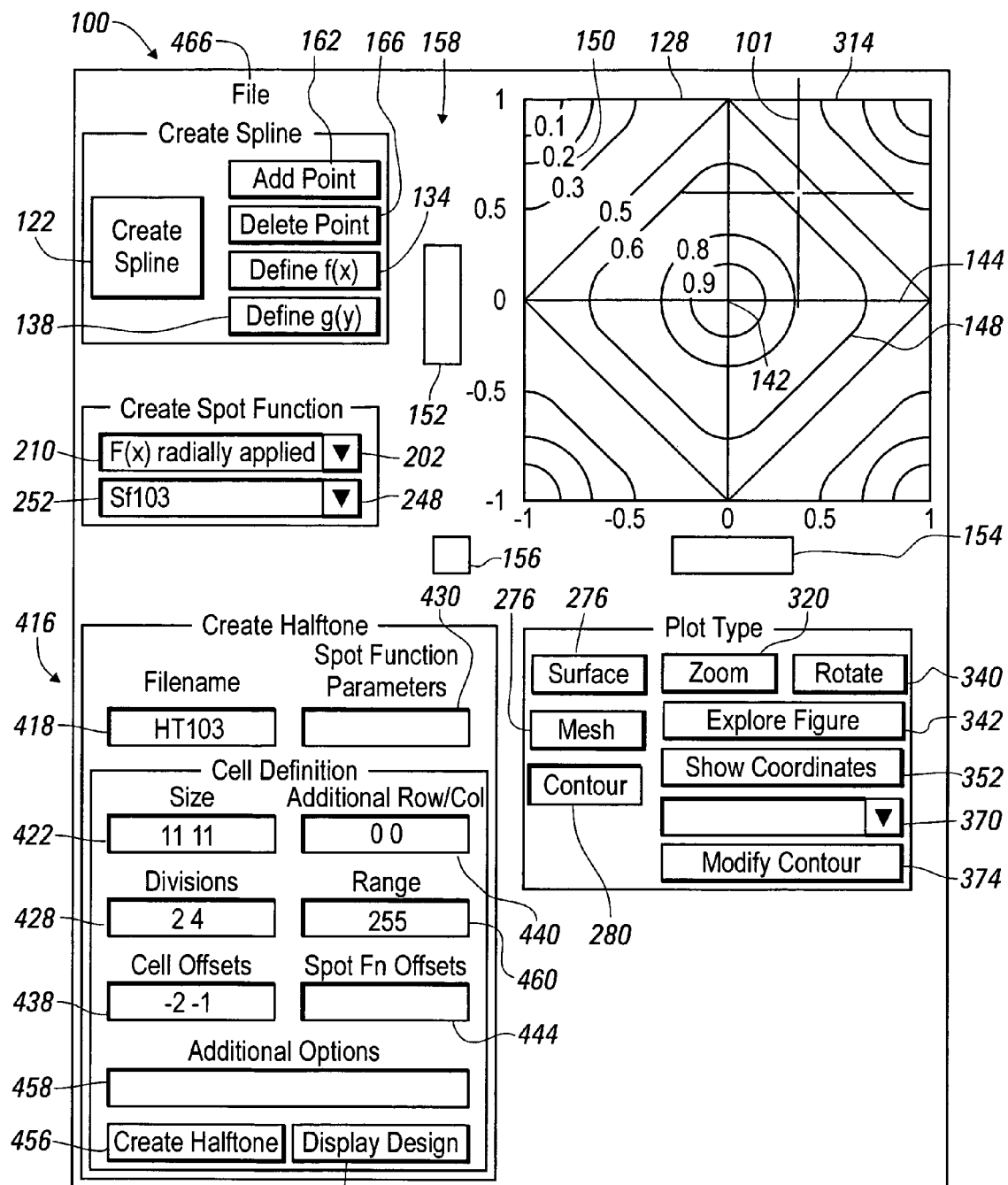
FIG. 6 shows a display screen presented as a user interface by the computer system of FIG. 4 during execution of the halftone spot design subroutine.

FIG. 6 shows the display screen 100 presented as a user interface by the computer system 10 during execution of the halftone spot function routine 12 in accordance with the invention, with user inputs being provided through the keyboard 52 and through the used of the mouse 54 to move a cursor 101 on the screen to provide data points and to select command buttons. The display screen 100 includes a plot window 102, in which points and lines generated during the process of designing a spot function are displayed. The plot window 102 is also used for displaying lines representing previously designed spot functions retrieved from data storage.

Figure 7:
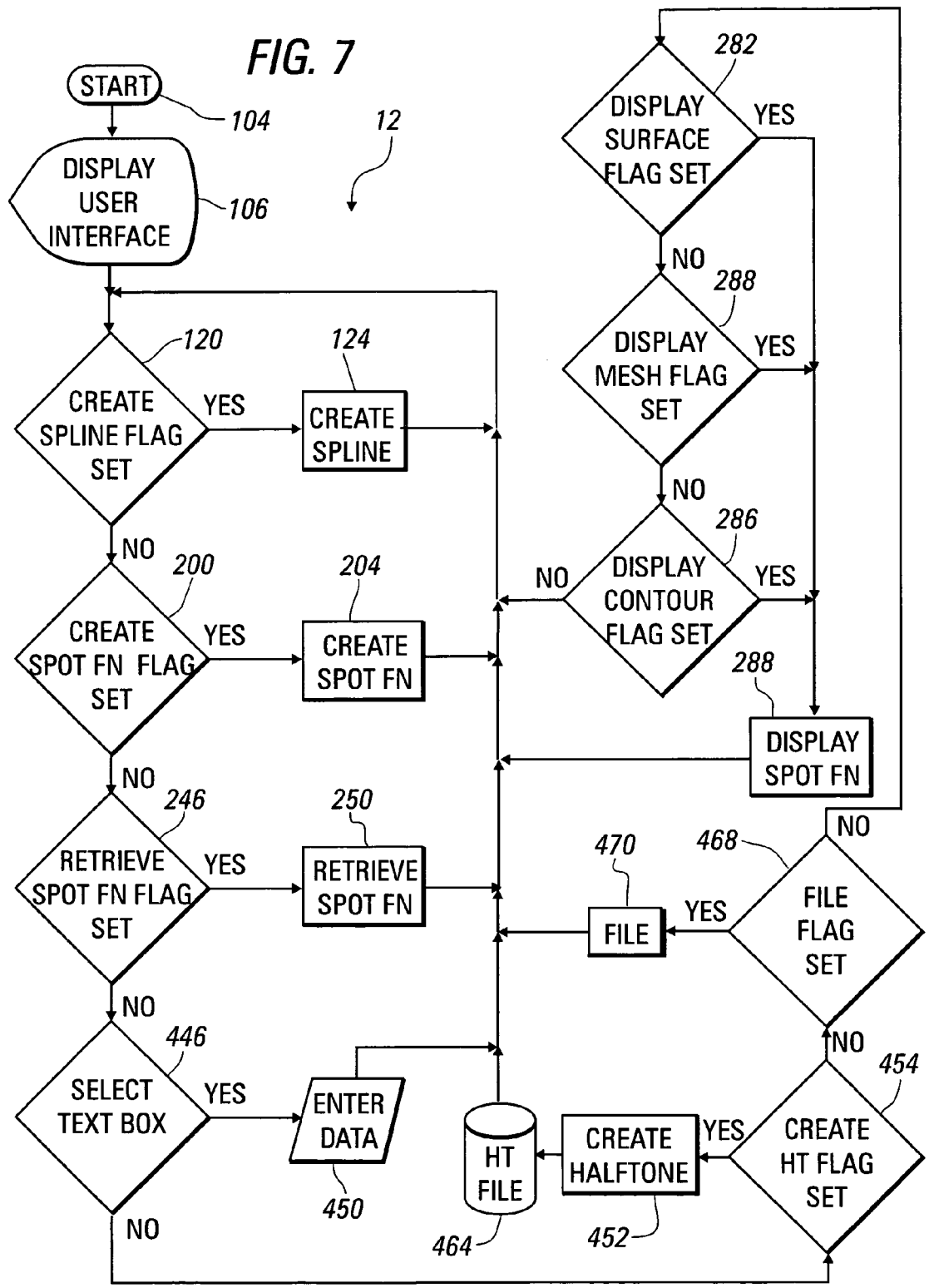
FIG. 7 is a flow chart of processes occurring during execution of the halftone spot design routine within the computer system of FIG. 4.

FIG. 7 is a flow chart of processes occurring during execution of the spot design routine 12 within the computer system 10. After starting in step 104, the routine 12 proceeds to step 106, in which a user interface display screen 100 is displayed on the display screen 60.

Figure 8:
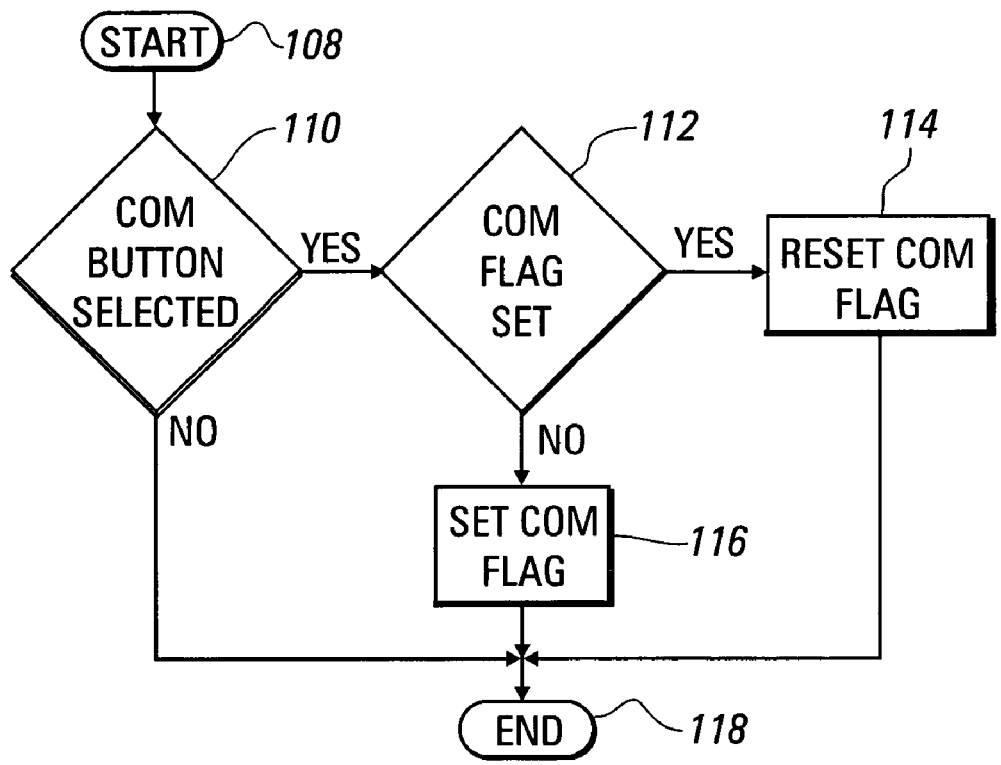
FIG. 8 is a flow chart of a subroutine for handling user inputs during execution of the halftone spot design routine of FIG. 7.

FIG. 8 is a flow chart of a subroutine handling user inputs made with the mouse 54. This subroutine starts in step 108 as a result of such an input. In step 110, a determination is made of whether one of the command buttons on the display screen 100 has been selected. If it has, an additional determination is made in step 112 of whether a flag bit associated with the command button has been set. If it has, it is reset in step 114. If it has not been set, it is set in step 116. In either case, this subroutine ends in step 118. In this way, a command button can be toggled, being selected and deselected, be repeated selection with the mouse 64. On the display screen 100, the shading of the command button is altered to make the button appear to be depressed with the associated flag bit is set.

After beginning to display the screen 100 in step 106, the halftone spot design routine 12 determines which of several subroutines to execute based on the states of the flag bits associated with particular command buttons. For example, if it is determined in step 120 that a create spline flag bit, associated with the "Create Spline" command button 122, is set, a create spline subroutine 124 is executed, allowing the user to provide curve segments, in the form of splines and associated control points, from which spot functions are constructed.

Figure 9:
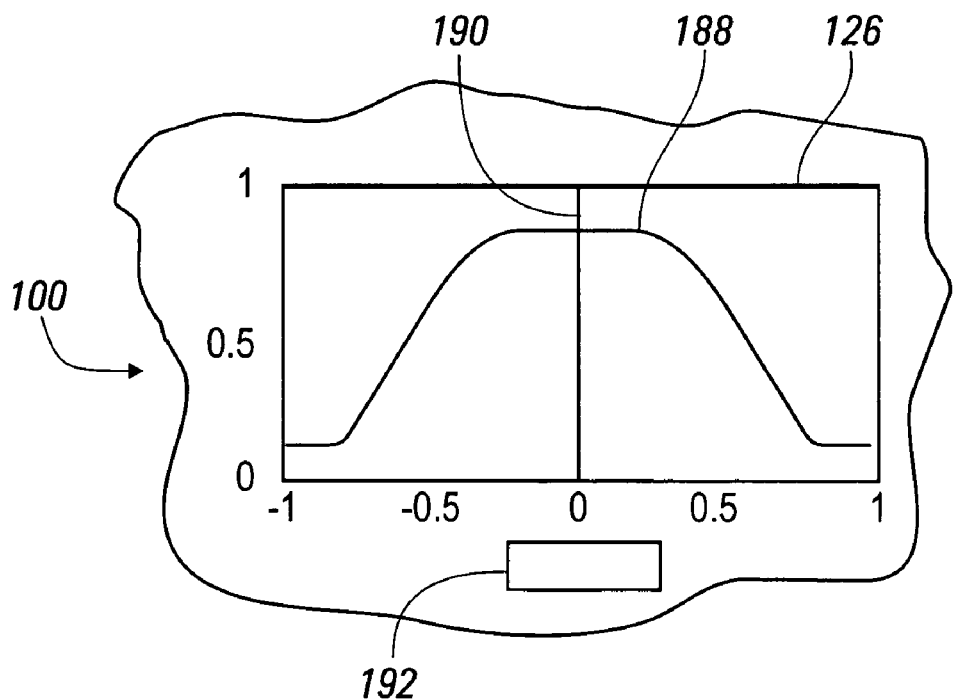
FIG. 9 is a fragmentary view of the display screen of FIG. 6, showing a plot area thereof with a cross sectional view of a spot function.

FIG. 9 is a fragmentary view of a version of the display screen 100, showing a cross-sectional grid 126 used during execution of the create spline subroutine 124. This cross-sectional grid 126 is placed within the plot window 102 in place of the contour map grid 128, shown in FIG. 6 to generate data regarding the shape of a line extending along at least a portion of a surface of a spot function through the center of the spot function in a first direction. Alternately, the contour map grid 128 is used during execution of the create spline subroutine 124.

Figure 10:
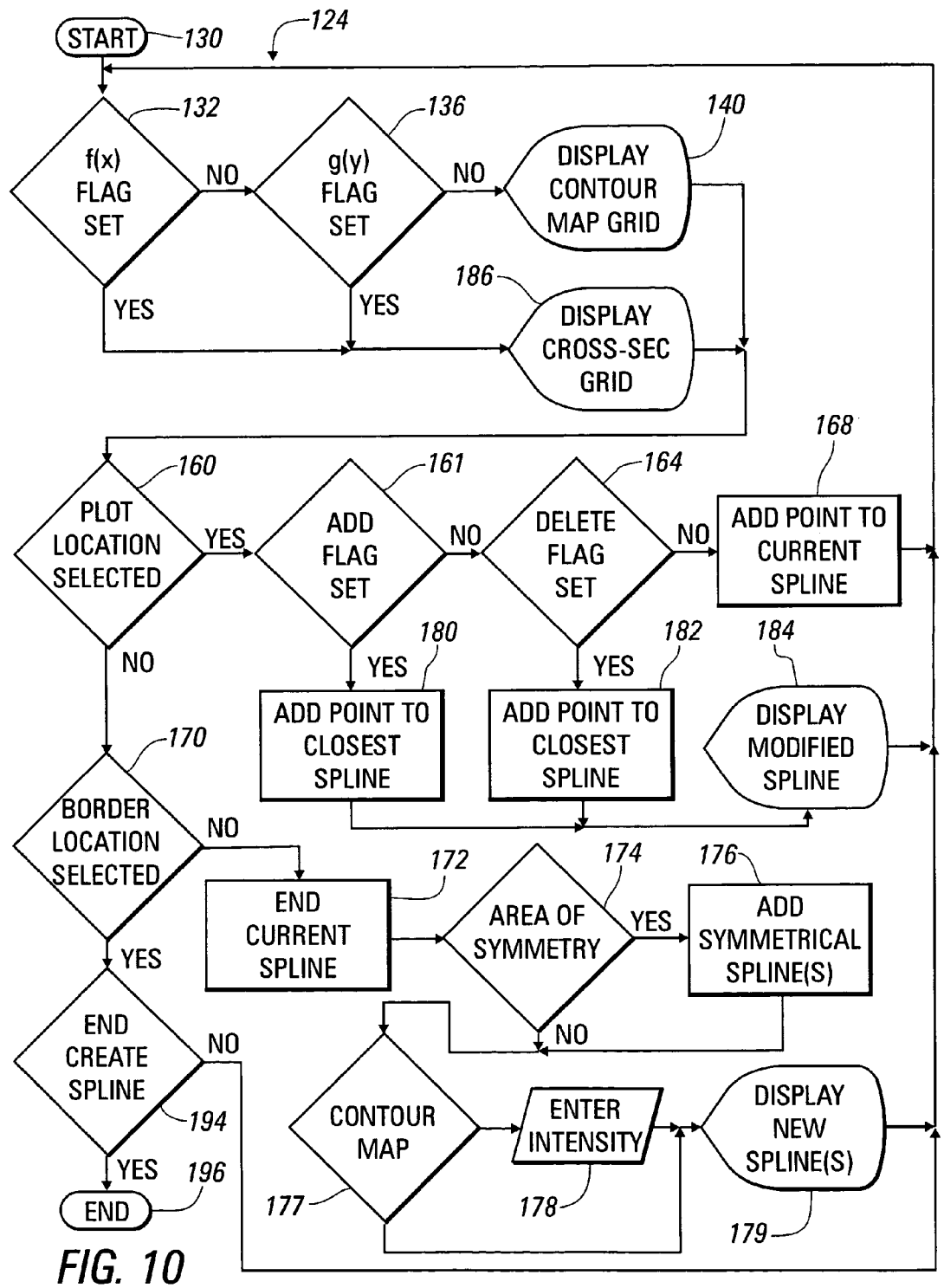
FIG. 10 is flow chart showing processes occurring during execution of a create spline subroutine within the halftone spot design routine of FIG. 7.

FIG. 10 is a flow chart showing processes occurring during execution of the create spline subroutine 124, which starts in step 130 following a determination in step 120 that the create spline flag bit, associated with the "Create Spline" command button 122, is set. The create spline subroutine 124 accepts inputs provided by selecting locations within the plot window 102 as control points for spline functions. First, a determination is made in step 132 of whether the f(x) flag bit, associated with the "Define f(x)" command button 134 has been set. If it has not been set, a further determination is made in step 136 of whether the g(y) flag bit, associated with the "Define g(y)" command button 116.

If neither the f(x) flag bit nor the g(y) flag bit have been set, the create spline subroutine 124 proceeds to step 140, in which the contour map grid 128, shown in FIG. 6, is displayed. This grid 128 shows a halftone spot cell extending along a horizontal (x) direction and a vertical (y) direction, to edges one unit away from the intersection 142 of the x-axis 144 and the y-axis 146. In the example of FIG. 6, the contour map grid 128 is filled with a number of contour lines 148 from an existing spot function. Each of the contour lines 148 is associated with an intensity level 150. When the intensity of a grayscale or color tone image being reproduced is less than the level associated with a contour line 148, the area within the contour line 148 will be filled with ink. Thus, the contour function is a three dimensional function having x- and y-dimensions extending along the halftone spot cell from its center and a z-dimension associated with intensity values.

In general, a contour line 148 may be asymmetrical, or it may be symmetrical about a single x- or y-axis, or about both x- and y-axes 144, 146. In accordance with one version of the invention, predetermined areas outside the plot area provided by the plot window 102 are provided to determine whether a line segment is to be symmetrical according to the placement of the final location selection, which indicates the end of the process defining the line segment. For example, if this final location is in a first area 152, the line segment is determined to be symmetrical about the x-axis 144, with an additional line segment, symmetrical with the line segment that has just been defined, being added and displayed. Similarly, if this final location is in a second area 154, the line segment is determined to be symmetrical about the y-axis 146, again with another line segment being added and displayed. If this final location is in a third area 156, the line segment is determined to be symmetrical about both x- and y-axes 144, 146, with three additional line segments being added, so that one line segment is in each of the four quadrants of the contour map grid 128. If this final location is within a border area 158 adjacent the plot window 102 but not in one of the areas 152, 154, 156, the line segment is determined to be asymmetrical, so that additional line segments are not added.

After beginning the display of the contour map grid 128 in step 140, the create spline subroutine 124 proceeds to step 160, in which a further determination is made of whether the user has selected a location within the plot window 102 using the mouse 54. If he has, the subroutine 124 proceeds to step 161, in which it is determined whether an add flag bit, associated with the "Add Point" command button 162, has been set. If it has not, a further determination is made in step 164 of whether a delete flag bit, associated with the "Delete Point" command button 166, has been set. If neither the add flag bit nor the delete flag bit have been set, a point is added to a spline being currently created in step 168. For example, if the user selects several points inside the plot window 102, followed by selecting a single point within the border area 158 outside the plot area of the plot window 102, the first point selected is used as the first control point of a spline function, with other points being added as control points in the order of their selection, and with the last point, determined in step 170 to have been selected within the border area 158 outside the plot window 102, being considered as an indication that the process of defining the spline function has been completed, During this selection process, the previously selected points are displayed within the plot window 102.

Following a determination in step 170 that a point has been selected within the border area 158, the process of defining the current spline is end in step 172, with the previously chosen point being the end control point of the function. Then, in step 174, a determination is made of whether the last point has been selected in one of the areas 152, 154, 156 requiring symmetry. If it has, the additional splines required for symmetry are added in step 176. Next, in step 177, a determination is made of whether the current spline has been added to a contour map. If it has, it is necessary to define the intensity level to be associated with the spline, so the user is asked to enter a number in a text box in step 178. In either case the spline or splines that have just been created are displayed in step 179.

After a line segment has been defined, it can be modified by adding, deleting control points. When the "Add Point" command button 162 is selected, setting the add flag bit, the create spline subroutine 124 determines in step 161 that the selection of a location within the plot window 102 is an indication that a control point is to be added within step 180 to the nearest line segment at the location selected, being considered to be between the adjacent control points already present. When the "Delete Point" command button 164 is selected, setting the delete flag bit, the create spline subroutine 124 recognizes in step 164 that the selection of a control point of a line segment is an indication that the control point is to be deleted in step 182. Following each of these modifications, the subroutine 124 calculates and displays the modified line segment in step 184.

A number of methods for converting control points into line segments or spline functions are well known to those skilled in the art of computer graphics. For example, numerical techniques described by Eric Lengyel in Chapter 15 of *Mathematics for 3D Game Programming and Computer Graphics*, Second Edition, Grove River Media, Inc., Hingham, Mass., 2004, which is incorporated herein by reference, may be implemented within the halftone spot design routine 12. In general, the line segment is formed by interpolating among the various control points according to a predetermined mathematical technique.

If it is determined in step 132 that the f(x) flag bit has been set by selecting the "Define f(x)" command button 134, or if it is determined in step 136 that the g(y) flag bit has been set by selecting the "Define g(y)" command button 138, the create spline subroutine 124 begins in step 186 to display the cross-sectional grid 126, shown in FIG. 9, providing a screen within the plot window 102 for defining a cross-sectional view of a spot by means of one or two cross-sectional shapes. The vertical axis represents the intensity achieved by filling the area at the indicated intensity under a curve segment 188 with ink. When it is determined in step 132 that the f(x) flag bit has been set, a curve segment 188 provided as an input by defining spline control points within the plot window 102 is used to define the cross-sectional shape of the spot function along the x-axis. When it is determined in step 136 that the g(y) flag bit has been set, the curve segment 188 is used to define the cross-sectional shape of the spot function along the y-axis. Either of these functions may be asymmetrical or symmetrical about the central vertical axis 190. Again, an area 192 is provided for an indication that the curve is to be symmetrical when the point indicating the end of the process of defining a line segment is located therein.

A contour line may be formed using an individual spline or by connecting a series of splines end to end.

The user can end the create spot function subroutine 124 by selecting the "Create Spline" command button 122 again, as described above in reference to FIG. 8, or by beginning another process that is incompatible with continuing the operation of the subroutine 124. When it is determined in step 194 that this has occurred, the subroutine 124 ends in step 196.

Figure 11:
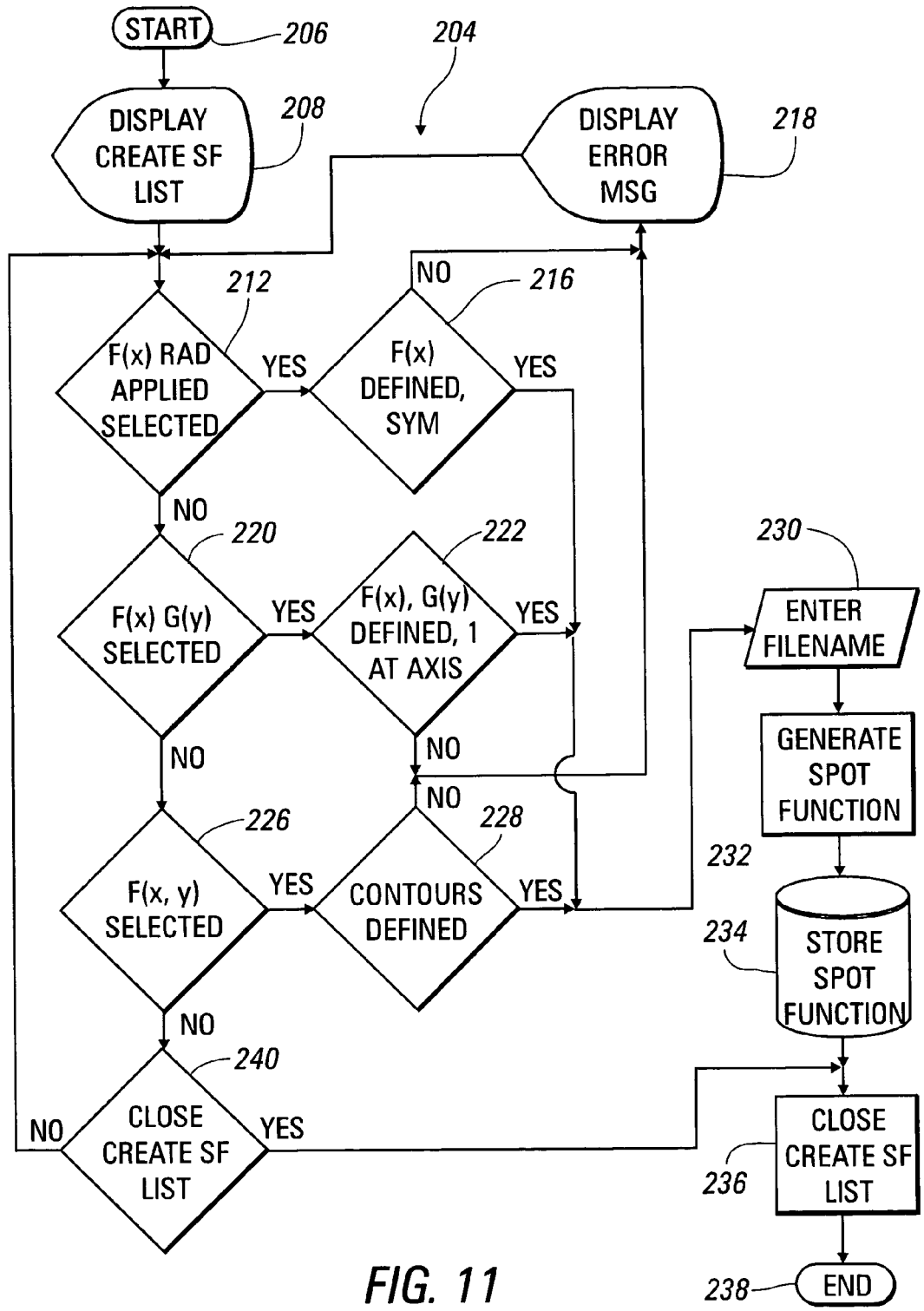
FIG. 11 is a flow chart showing processes occurring during execution of a create spot function subroutine within the halftone spot design routine of FIG. 7.

Referring again to FIGS. 6 and 7, when it is determined in step 200 that the create spot function flag bit has been set by selecting a create spot function list drop down arrow 202, the create spot function subroutine 204 is started. The operation of this subroutine 204 will now be explained with reference to FIGS. 11 and 12. FIG. 11 is a flow chart showing processes occurring during execution of the create spot function subroutine 204. FIG. 12 shows a "Create Spot Function" drop down list 210, with entries describing methods for generating a spot function from line segments during the execution of the create spline subroutine 204.

After starting in step 206, in response to a determination in step 200 that the create spot function flag has been set, the create spot function subroutine 204 proceeds to step 208, in which a create spot function list box 210, associated with the drop down arrow button 202, is opened. If it is determined in step 212 that the "f(x) radially applied" entry 214 has been selected selected, an attempt will be made to generate a spot function using a line segment generated as f(x) with the f(x) flag bit set with all contours of the spot function being circular, and with the intensity being strictly a function of the radius from the z-axis. This process requires that the function f(x) must be defined and symmetrical about the z-axis, as determined in step 216; otherwise an error message is displayed in step 218.

If it is determined in step 220 that the "f(x)g(y)" entry 222 has been selected, an attempt will be made to generate a spot function that is the product of the function f(x), which has been with the "Define f(x) command button 186 selected, times the function g(y), which has been defined with the g(y) flag bit set to cover the entire halftone spot cell. While symmetry is not required, as further determined in step 224, both f(x) and g(y) must have been defined, and the maximum values of both these functions must be one; The defined function can be scaled to comply to this requirement. An error message is displayed in step 218 if this condition is not met. This type of function has an advantage of providing computational simplicity, so that it can be readily used to generate a large number of halftone spots.

If it is determined in step 226 that the "f(x,y)" entry 228 has been selected, an attempt is made to generate a spot function by interpolating among various contour lines that have been plotted during execution of the create spline subroutine 134 without either the f(x) flag bit or the g(y) flag bit being set. This requires that such contour lines must have been defined, as determined in step 228; otherwise an error message is displayed in step 218.

A number of methods for converting a plurality of contour lines into three dimensional surfaces are well known to those skilled in the art of computer graphics. In general, the three dimensional surface is formed by interpolating among coordinate values of the various contour lines according to a predetermined mathematical technique.

If it is determined in step 216, in step 224, or in step 228 that the data for generating a spot function is present, the create spot function subroutine 204 proceeds to step 230, in which a text box is displayed to allow the user to enter a filename for the spot function being created. After this has been done, the spot function is generated in step 232 and stored in step 234. Then, in step 236, the "Create Spot Function" drop down list 210 is closed, with the create spot function subroutine 204 then ending in step 238.

Alternately, the user may choose to end the create spot function subroutine 204 without generating a spot function. For example, such a decision may be made in response to an error message displayed in step 218. The user can cause the subroutine to end by again selecting the create spot function drop down arrow button 202 or by making another selection that is incompatible with the subroutine 204. When such an action is determined in step 240 to have occurred, the drop down list 210 is closed in step 236, and the subroutine 204 is ended in step 239.

Referring again to FIGS. 6 and 7, when it is determined in step 246 that the retrieve spot function flag has been set by selecting a retrieve spot function list drop down arrow button 248, the retrieve spot function subroutine 250 is started. The operation of the retrieve spot function subroutine will now be explained with reference being made to FIGS. 13 and 14. FIG. 13 is a flow chart showing processes occurring during execution of the retrieve spot function subroutine 250, while FIG. 14 is fragmentary view of the display screen 100, showing a stored file drop down list 252, associated with the drop down arrow button 248. The drop down list 252 includes a number of entries 254 identifying spot functions that have been saved.

According to a preferred version of the invention, these entries may have been saved in two or more different formats.

For example some of the spot functions represented by these entries may have been saved in a format specifying one or more equations for three-dimensional surfaces defining the shape of the spot within the halftone cell as a function of intensity. Alternately, spot function file may have been saved in a bitmap format, such as a JPEG format, with the halftone cell being divided into pixels having grayscale or tonal levels, each of which represents a level of intensity below which ink is to be printed within the portion of the halftone cell represented by the pixel. It should be understood that in all cases the image or spot function may require suitable scaling or warping along the axis of the halftone cell to fit the region defined by the halftone cell. Alternately, spot function files may have been saved in a vector format native to the spot design subroutine 12.

After starting in step 256, in response to a determination in step 246 that the retrieve spot function flag has been set, the retrieve spot function subroutine 250 proceeds to step 258, in which the stored file dropdown list 252 is opened. When it is then determined in step 260 that an entry 254 of the list 252 has been selected, the stored file associated with the entry 254 is retrieved in step 262. Then, in step 264, the stored file drop down list is closed, with the retrieve spot function subroutine ending in step 266.

Alternately, the user may choose to end the retrieve spot function subroutine 250 without retrieving a spot function, for example, because the desired spot function could not be found. The user can cause the subroutine to end by again selecting the retrieve spot function drop down arrow button 218 or by making another selection that is incompatible with the subroutine 250. When such an action is determined to have occurred in step 268, the drop down list 252 is closed in step 264, and the subroutine 250 is ended in step 266.

Referring again to FIGS. 6 and 7, the display screen 100 includes a "Surface" command button 276, a "Mesh" command button 278, and a "Contour" command button 280, which are used to determine how the current spot function of the halftone spot design routine 12 is displayed. The current spot function may be a spot function that has been designed during the execution of the create spot function subroutine 204 or a spot function that has been retrieved using the retrieve spot function subroutine 250. When it is determined in step 282 that the surface flag bit has been set by selecting the "Surface" command button 277, when it is determined in step 284 that the mesh flag bit has been set by selecting the "Mesh" command button 278, or when it is determined in step 286 that the contour flag bit has been set by selecting the "Contour" command button, the halftone spot design routine 12 starts the display spot function subroutine 288.

Figure 15A:
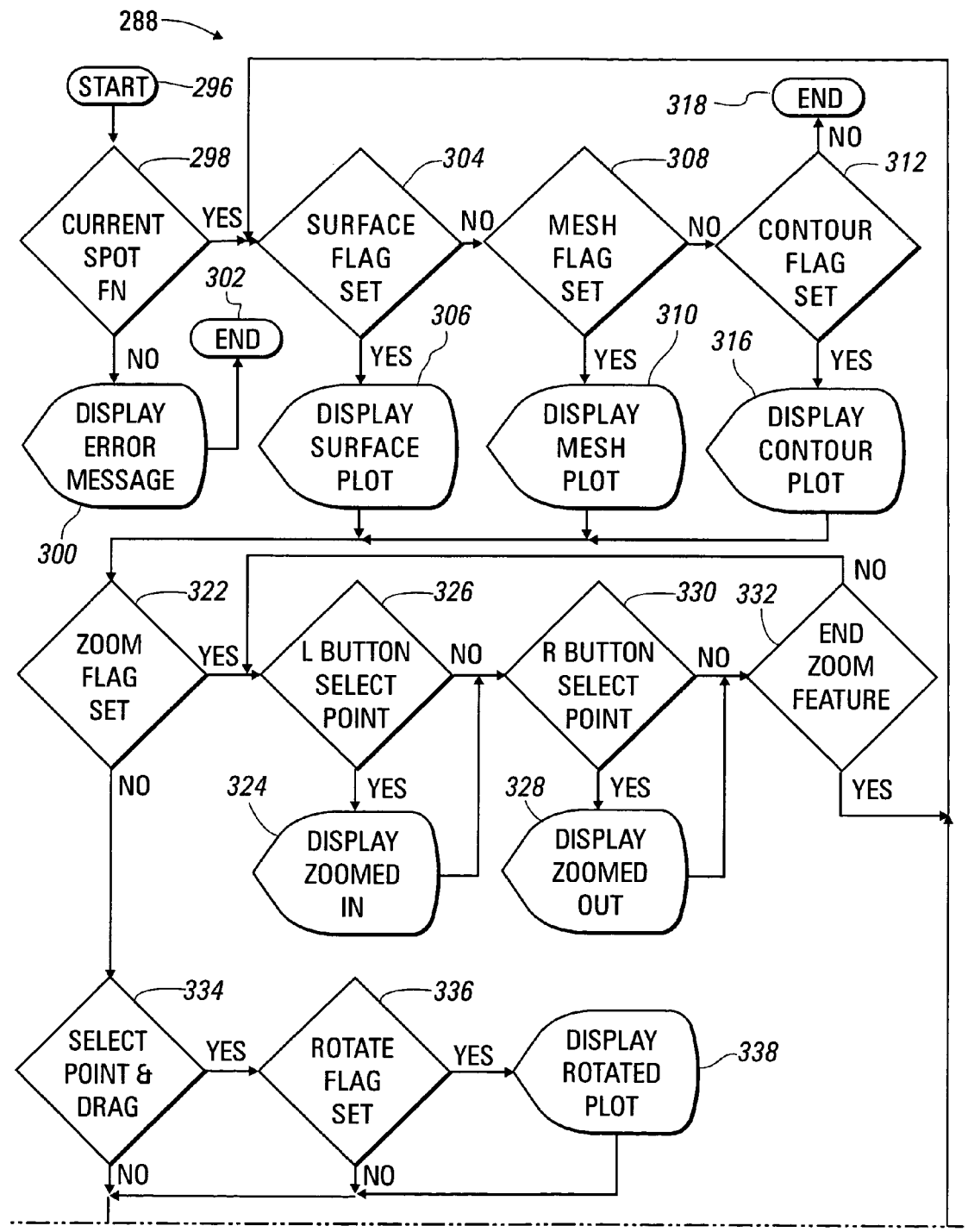
FIG. 15, which is a flow chart showing processes occurring during execution of a display spot function subroutine within the halftone spot design routine of FIG. 7, is divided into an upper portion, indicated as FIG. 15A, a central portion, indicated as FIG. 15B, and a lower portion, indicated as FIG. 15C.
Figure 15B:
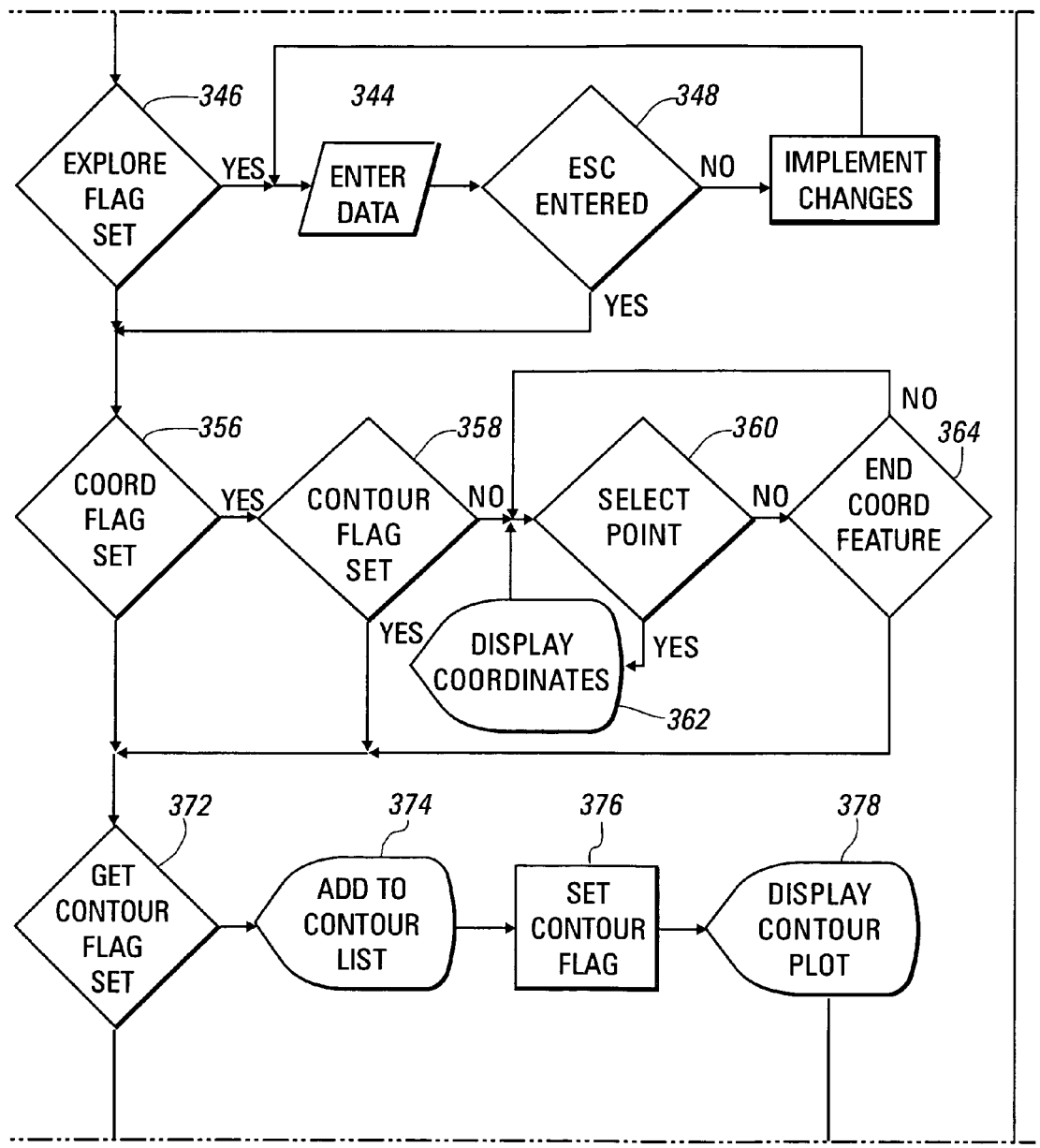
Figure 15C:
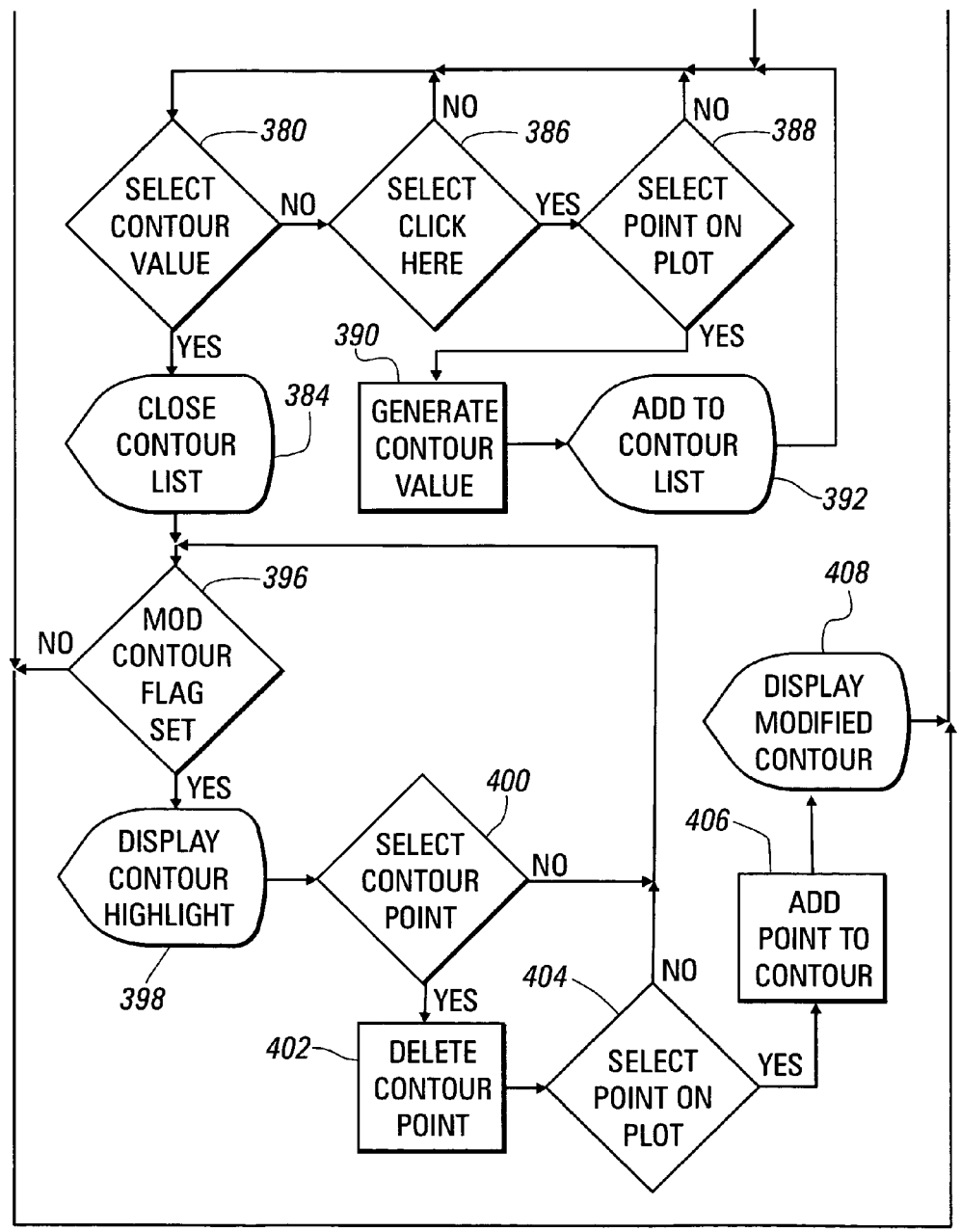

The operation of the create spot function subroutine 288 will now be explained with reference being made to FIGS. 15-17. FIG. 15, which is a flow chart showing processes occurring during operation of the subroutine 288, is divided into an upper portion, indicated as FIG. 15A, a central portion, indicated as FIG. 15B, and a lower portion, indicated as FIG. 15C.

Figure 16:
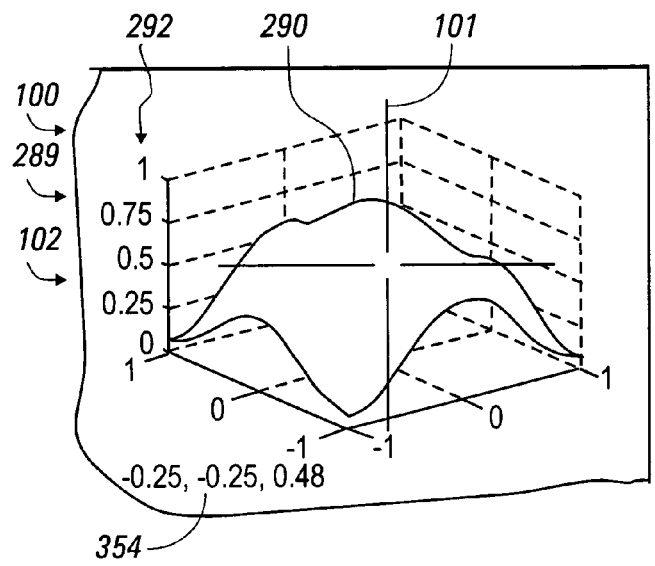
FIG. 16 is a fragmentary view of the display screen of FIG. 6, showing a plot area thereof with a spot function shown as a three-dimensional surface during execution of the display spot function subroutine of FIG. 15.

FIG. 16 is a fragmentary view of the display screen 100, showing the plot window 102 with a surface plot 289 of the spot function, with the spot function being shown as a three-dimensional surface 290, with the intensity level being indicated as the vertical z-axis 292. It should be noted that commonly the spot function intensity level is referred to as priority value in some literature. The intensity levels can vary between −1, with all of the paper being covered with ink, and 1, with none of the paper being covered with ink.

Figure 17:
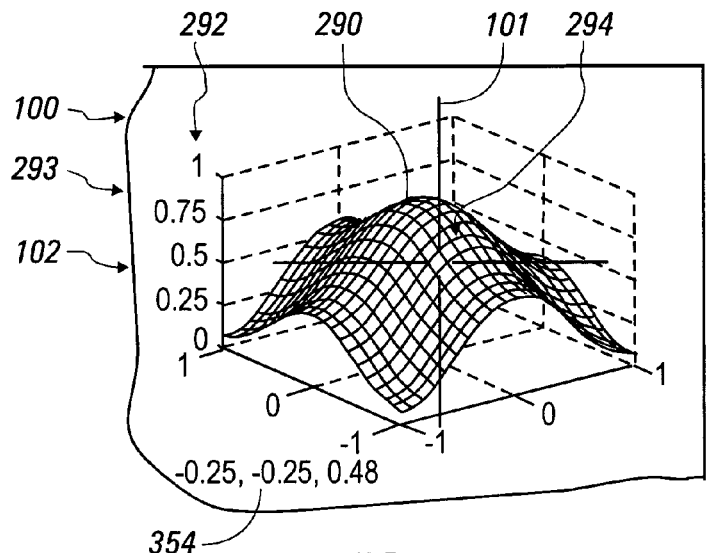
FIG. 17 is a fragmentary view of the display screen of FIG. 6, showing a plot area thereof with a spot function shown as a three-dimensional surface covered with a mesh during execution of the display spot function subroutine of FIG. 15.

FIG. 17 is a fragmentary view of the display screen 100, showing the plot window 102 with a mesh plot 293 of the spot function, which is again shown as a three dimensional surface 290, with a mesh 294 added to extend along the surface 290 rendering various of its features visible.

After starting in step 296, the display spot function subroutine 288 determines, in step 298, whether a current spot function is present within the halftone spot design subroutine 12; if it is not, an error message is displayed in step 300. After providing the user with time to read the error message, and, for example, requiring him to select an "OK" command button, the display spot function subroutine 288 ends in step 302. At this point, the user can complete creating a spot function, using the create spot function subroutine 204, before it can be displayed, or he can retrieve a previously designed spot function using the retrieve spot function subroutine 250.

If it is determined in step 298 that a current spot function is present, the display spot function subroutine 288 proceeds to determine the form in which the spot function is to be displayed, going first to step 304, in which it is determined whether the surface flag bit has been set in response to selecting the "Surface" command button 276. If it has, the surface plot 289 is displayed in step 306. If it has not been set, a further determination is made in step 308 of whether the mesh flag bit has been set in response to selecting the "Mesh" command button 278. If it has, the mesh plot 283 is displayed in step 310. If the mesh flag bit has not been set, it is further determined in step 312 whether the contour flag is set. If it is the contour plot 314 of the spot function, as shown in FIG. 6, is displayed in step 316. While it is understood that the display spot function subroutine has started provides an indication that either the surface flag bit, the mesh flag bit, or the contour flag bit should be expected to be set, this process allows the resetting of one of these flag bits without setting another of these flag bits to be used to end the display spot function subroutine 288 in step 316.

In a preferred version of the invention, the user is additionally provided with a number of ways to display and interact with portions of the spot function. For example, when the "Zoom" command button 320 is selected, a zoom flag bit is set, so that moving the cursor 101 to a position over the plot within the plot window 102 and pushing the right mouse button causes the view of the curve to zoom out from the position indicated by the cursor, while pushing the left mouse button causes the view of the curve to zoom in from this position. Thus, in step 322, a determination is made of whether the zoom bit flag has been set. If it has, the display is zoomed inward in step 324, following a determination in step 326 that a point within the plot area 102 has been selected with the left mouse button, and outward in step 328 following a determination in step 330 that a point within the plot area has been selected with the right mouse button. After zooming, the normal view of the curve is restored by selecting one of the "Contour," "Surface," or "Mesh" command buttons 276, 278, 280. Thus, when such a selection is determined to have occurred in step 332, the display spot function subroutine 288 returns to step 304 to begin a normal display of the spot function according to the flag bit that has been set.

The normal mode of operation of the display spot function subroutine provides a feature allowing rotation of the image of the spot function when a determination is made in step 334 that a point on the spot function, as displayed within the plot display window 102, has been selected and dragged in a direction establishing a desired direction of rotation. Since this normal mode of operation is provided when a rotate flag bit is set, a determination is made in step 336 of whether this flag bit has been set. If it has, the displayed plot is rotated in step 338. The rotate flag bit is toggled, being set and reset, by selecting the "Rotate" command button 340.

When the "Explore Figure" command button 342 is selected, an explore flag bit is set, enabling a feature allowing a number of alphabetic characters entered in step 344 through the keyboard 52 to establish shortcuts for changing the way the spot function is displayed permitting a "fly by" type visualization of the spot function. Thus, when a determination is made in step 346 that the explore flag bit has been set, entering the letter "f" causes the system to zoom incrementally forward, or inward, while entering the letter "b" causes the system to zoom incrementally backward, or outward. Entering the letter "r" causes the system to rotate the image of the spot function to the right, while entering the letter "l" causes the system to rotate the image of the spot function to the left. Entering the letter "a" decreases the step through which zooming occurs when "f" or "b" is entered, while entering the letter "s" increases this step. Entering the letter "z" decreases the angular step occurring in response to entering the letter "r" or "l," while entering the letter "x" increases this angular step. Depressing the "Esc" (escape) key causes the system leave this feature, returning to displaying the figure shown on the plot area before the "Explore Figure" command button was selected. Therefore, when data is entered in step 344, a determination is made in step 348 of whether the "Esc" character has been entered. If it has not changes within the spot function design subroutine 288 are implemented in step 350 according to the data that has been entered. If the "Esc" character has been entered, the subroutine 288 returns to step 304 to determine the method in which the spot function was displayed before setting the explore flag bit.

When a surface or mesh plot of the spot function is being displayed, as shown in FIGS. 16 and 17, selecting the "Show Coordinates" command button 352, sets the coordinates flag bit, causes the x, y, and z coordinates 354 of the point indicated by making a selection with the cursor 101 to be displayed. Thus, when a determination is made in step 356 that the coordinates flag bit has been set, an additional determination is made in step 358 of whether the contour flag has been set. If it has, the coordinates of a point on the surface of the spot function selected within the plot window 102 in step 360 are displayed in step 362. The user may end the use of this feature by again selecting the "Show Coordinates" command button 352 or by performing another action incompatible with this feature, such as choosing to display a contour plot, as determined in step 364.

Figure 18:
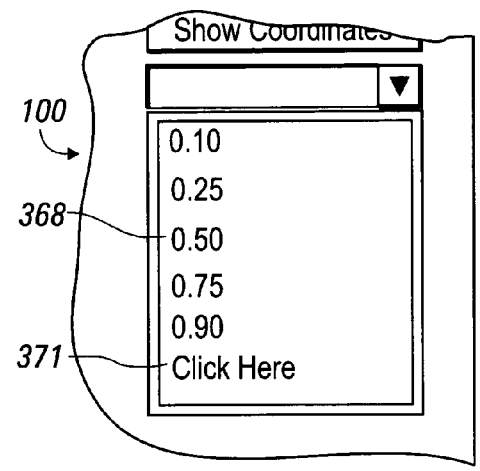
FIG. 18 is a fragmentary view of the display screen of FIG. 6, showing a drop down list for selection of a contour line within a spot function during execution of the display spot function subroutine of FIG. 15.

FIG. 18 is a fragmentary view of the display screen 100, showing a drop down list 366 of contour lines within the current spot function being displayed, with each of the contour lines being identified by an intensity level 368 with which it is associated. This drop down list 356, which is displayed when an associated drop down arrow 370 is selected, setting a get contour flag bit, is used to select a contour line for modification. If the "Click Here" list entry 371 is selected, the program generates a contour line going through a point selected using the cursor 101 on the spot function displayed within the plot window 102. This new contour line is then displayed in the drop down list 366, being identified by the intensity level with which it is associated. Thus, when a determination is made in step 372 that the get contour flag bit has been set, the drop down list 366 is displayed in step 374. Next, in step 376, the contour flag bit is set, with the contour plot being displayed in step 378. This has no effect if the contour plot is already being displayed.

Next, the display spot function subroutine proceeds to determine if the user has selected an entry on the drop down list 366. Specifically, if it is determined in step 380 that the user has selected one of the contour lines identified by intensity values 368, the drop down list 366 is closed in step 384.

On the other hand, when it is determined in step 386 that the "Click here" entry 371 has been selected, the subroutine 288 proceeds to step 388, in which a determination is made of whether the user has selected a point in the plot area 102. When such a point is selected, a contour line is generated to pass through the selected point in step 390, with this new contour line being added to the drop down list 366 in step 392, providing an additional entry that can be selected when the subroutine 288 then returns to step 380. The drop down contour list 366 may also be closed at any time in the process by the user again selecting the drop down list arrow 370.

After a contour line is selected using drop down list 366, selecting the "Modify Contour" command button 394 sets a modify contour flag, as determined in step 394, causing the display spot function subroutine 288 to begin a process for modifying the selected contour line by highlighting points on the contour line in step 398. Then, selecting one of the points on the contour line with the cursor 101, as determined in step 400, causes the point to be deleted in step 402. The selected point is then moved to a position indicated by the next selection of a location within the plot window 102. Thus, when it is determined in step 404 that a selection of another location within the plot window 102 has occurred, the new point is added as a control point to the contour line in step 406. Then, in step 408, the modified contour line is displayed as a part of the spot function. If, during this process, the user decides not to continue with the modification of the contour line, he can reset the modify contour flag by again selecting the "Modify Contour" command button 394, so that, after returning to step 396, the subroutine 288 will return to step 304.

FIG. 19 is a graphical view of a rectangular halftone supercell 410 including a number of halftone spot cells 412, arranged for printing on a printer capable of printing device pixels 414, each of which represents the smallest area that can be either filled with ink or left blank. An important characteristic of the halftone supercell 410 is that it is of a form that can be tiled, to form a multitude of identical patterns extending in both horizontal and vertical directions.

Referring again to FIG. 6, according to a preferred version of the invention, the display screen 100 includes a number of text boxes 416 in which information can be entered to describe a halftone pattern being created using rectangular supercells. Data is entered into each of these text boxes by selecting the text box by moving the cursor 101 and by then depressing the left mouse button, and by then entering the data using the keyboard 52. The "Filename" textbox 418 is used to enter a filename for the new halftone pattern. The "Spot Function Parameters" text box 420 is optionally used to enter data describing the current spot function.

Data describing the halftone supercell 410, graphically shown in FIG. 19, is shown as entered within the text boxes. The size of the halftone supercell 410 being defined is entered in the "Size" text box 422, with the width in device pixels being followed by the height in device pixels, in the form of two numbers separated by a space. Thus, the size of the halftone supercell 410 is described in terms of the number of device pixels extending adjacent one another in a first direction (i.e. the width of the supercell) and in terms of the number of device pixels extending adjacent one another in a second direction (i.e. the height of the supercell.) The halftone supercell 410 is 11 device pixels wide and 11 device pixels high. In the horizontal direction, along the lower edge 424, the halftone supercell 410 is divided into two halftone spot cells 412, while, in the vertical direction, along the right edge 426, the halftone supercell 410 is divided into four halftone spot cells 412. These numbers of division, 2 and 4, are entered at the "Divisions" text box 428, again being separated by a space, with the horizontal value being entered first. In this way, the halftone supercell 410 is further described in terms of the number of halftone spot cells 412 extending adjacent one another within the supercell 410 in each direction.

Cell offsets specify the angles of the cell division lines dividing the halftone supercell 410 into halftone spot cells 412 in terms of the distances through which the cell division lines are inclined between opposite sides of the supercell 410. A horizontal offset is expressed as the number of halftone spot cell spaces through which a cell division line 430 is inclined in a horizontal direction of arrow 436 within the supercell 410 as it approaches the lower edge 424. In this example, the line 430 is inclined opposite the direction of arrow 436 through two halftone spot cell spaces, resulting in a horizontal offset value of −2. A vertical offset is expressed as the number of halftone spot cell spaces through which a cell division line 434 is inclined in the vertical direction of arrow 432 within the supercell 410 as it approaches the right edge 426. In this example, the line 434 is inclined opposite the direction of arrow 432 through one halftone spot cell space, resulting in a vertical offset value of −1. These values are entered at the "Cell Offsets" text box 438, again being separated by a space, with the horizontal offset value being entered first. This arrangement produces a supercell having a number of individual halftone cells. The supercells tile when placed horizontally adjacent to one another and vertically as additional rows of supercells. Each row of supercells are tiled without offsets. Each complete halftone cell is therefore uniform in size and shape.

Additional rows and columns may be specified in the "Additional Row/Col" text box 440, increasing the size of the supercell 410 by adding rows and columns. While this feature is ordinarily not used, it is available for creating a larger supercell that can be used as the basis for an interpolated threshold array.

Individual halftone spots derived from the spot function may be offset in the x- and y-directions within the halftone spot cells 412 through distances, expressed in device pixels, entered within the "Spot Fn Offsets" text box 444.

Additionally referring again to FIG. 7, when it is determined in step 446 that one of the text boxes 416 has been selected, the halftone spot design subroutine 12 receives data entered at the text box 416, using the keyboard 52, in step 450. The entry of data is ended in the usual way, when a code is received indicating that the "Enter" key has been depressed.

The create halftone subroutine 452, in which a halftone pattern is created according to the data entered in the text boxes and the current spot function, begins in step 454 with a determination that the create halftone flag bit has been set be selecting the "Create Halftone" command button 456. The create halftone subroutine 432 may additionally use parameters that are entered at the "Additional Options" text box 458. According to one version of the invention, the process of creating a halftone pattern includes calculating threshold and priority values, for which minimum values are specified by data entered at the "Range" text box 460. Various parameters of the halftone design pattern being created using the create halftone subroutine 452 may be displayed following the selection of the "Display Design" command button 462. For example, these calculated values are shown for threshold values and priority values, along with an area varying in density, which is generated using the halftone pattern. The create halftone subroutine 452 causes one or more files to be stored in step 464, with these files including data representing the halftone pattern in a form usable within a printer.

The display screen 100 preferably additionally includes a menu area having a "File" selection area 466. When this area 466 is selected, as determined in step 468, a file subroutine 470 is started.

FIG. 20 is a flow chart showing processes occurring during execution of the file subroutine 470. After starting in step 472 in response to a determination in step 468 that the file flag has been set, the file subroutine 470 proceeds to step 474, in which a file list 476 is displayed as a drop down list from the "File" selection area 466.

FIG. 21 is a fragmentary view of the display screen of FIG. 6, showing the drop down file list 466 as a menu listing save and retrieve operations to be selected during execution of the file subroutine 470. The list 466 includes a list 478 of splines available for loading and a list 480 of spot functions available for loading. When an item from one of these lists 478, 480 is selected, as determined in step 482, the file including data describing the item is retrieved in step 484. When the user selects a save operation 486 from the file list 476, as determined in step 488, a text box is displayed to enter a file name, and the corresponding current spline or spot function is saved in step 490. After retrieving a stored file in step 484 or saving a file in step 490, the file list 476 is closed in step 492, with the file subroutine 470 ending in step 494. The user can also end the file subroutine 470, for example, by again selecting the "File" selection area 466. When such an action is determined to have occurred in step 496, the subroutine also proceeds to step 492.

While the invention has been described in its preferred forms or embodiments with some degree of particularity, it is understood that this description has been given only by way of example, and that many variations can be made without departing from the spirit and scope of the invention, as defined in the appended claims.

We claim:

1. A method of printing a halftone spot within an image by generating a halftone spot function having values representing a contour of the halftone spot within a halftone spot cell as a function of image intensity information from the image being printed in an area corresponding to the halftone spot cell, the method comprising:
 receiving data describing a first line segment extending along a plane;
 generating a three dimensional function to extend within the halftone spot cell, wherein a portion of a line extending along the three dimensional function in a first direction through a center of the halftone spot cell is shaped as the first line segment;
 storing the three dimensional function as a portion of the halftone spot function;
 determining the contour of the halftone spot within the halftone spot cell based on the generated halftone spot function; and
 printing the halftone spot within the image using the determined contour.

2. The method of claim 1, wherein the data describing a first line segment is generated by a method including:
 receiving inputs describing locations of a plurality of control points along a plot area representing a distance within the halftone spot cell from a center of the halftone spot cell in a first direction and a level of image intensity in a second direction, perpendicular to the first direction; and
 generating a curved line segment by interpolating among the plurality of control points.

3. The method of claim 2, wherein receiving inputs describing locations of a plurality of control points is followed by receiving an input describing a location in an area outside the plot area to end a process of receiving inputs describing locations of a plurality of control points.

4. The method of claim 1, wherein the data describing a first line segment is read from storage.

5. The method of claim 1, wherein the three dimensional function generated as a surface of revolution about an axis representing the center of the halftone spot cell, wherein a line extending along the three dimensional function radially in any direction from a center of the halftone spot cell is shaped as the first line segment.

6. The method of claim 1, wherein the method additionally comprises receiving data describing a second line segment extending along a plane, a first line extending along a first axis of the three dimensional function, through a center of the halftone spot cell in a first direction has a shape of the first line segment, a second line extending along a second axis of the three dimensional function, through the center of the halftone spot cell in a second direction, at an angle to the first direction, has a shape of the second line segment, and each point of the three dimensional function offset from the second axis through a first distance and offset from the first axis through a second distance has a value of a product of a value of the first line at the second distance from the center of the halftone spot cell and a value of the second line at the first distance from the center of the halftone spot cell.

7. The method of claim 6, wherein the data describing first and second line segments is generated by a method including:
receiving inputs describing locations of a first plurality of control points along a plot area representing a distance within the halftone spot cell through a center of the halftone spot cell in a first direction and a level of image intensity in a second direction, perpendicular to the first direction; and
generating a curved line segment by interpolating among the plurality of control points.

8. The method of claim 7, wherein receiving inputs describing locations of a plurality of control points is followed by receiving an input describing a location in an area outside the plot area to end a process of receiving inputs describing locations of a plurality of control points.

9. The method of claim 8, wherein an additional curved line segment symmetrical to the curved line segment generated by interpolating among the plurality of control points is generated in response to receiving an input describing a location in a predetermined area outside the plot area to end the process of receiving inputs describing locations of a plurality of control points.

10. A method for printing a halftone spot within an image by generating a halftone spot function having values representing a contour of the halftone spot within a halftone spot cell as a function of image intensity information from the image being printed in an area corresponding to the halftone spot cell, the method comprising:
for a plurality of contour lines, performing the following steps a) through d):
a) receiving inputs describing locations of a plurality of control points along a plot area representing the halftone spot cell;
b) receiving an input describing a location of an area outside the plot area to end a process of receiving inputs describing locations of a plurality of control points;
c) generating a line segment by interpolating among the plurality of control points; and d) receiving an input describing an intensity value to be associated with a contour line including the line segment;
generating a three dimensional function to extend within the halftone spot area by interpolating among the plurality of contour lines;
storing the three dimensional function as a portion of the halftone spot function;
determining the contour of the halftone spot within the halftone spot cell based on the generated halftone spot function; and
printing the halftone spot within the image using the determined contour.

11. The computer method of claim 10, wherein, within step c), an additional line segment symmetrical to the line segment generated by interpolation among the plurality of control points is generated in response to determining that the input received in step b) describes a location in a predetermined area outside the plot area.

12. A method for generating halftone data for printing an image by a printer producing a plurality of alternately inked and blank device pixels, wherein the method determines contours of halftone spots within a plurality of halftone spot cells in a halftone supercell as a function of image intensity information from the image being printed in an area corresponding to the halftone supercell, the halftone supercell is tileable for repeated adjacent placement in a first direction and in a second direction, perpendicular to the first direction, the method comprising:
receiving data describing a three dimensional halftone spot function having values representing a contour of a halftone spot within each of the halftone spot cells as a function of image intensity information from the image being printed in an area corresponding to the halftone spot cell;
receiving data describing a number of device pixels extending adjacent one another within the halftone supercell in the first direction and a number of the device pixels extending adjacent one another within the halftone supercell in the second direction;
receiving data describing a number of the halftone spot cells extending adjacent one another within the halftone supercell in the first direction and a number of the halftone spot cells extending adjacent one another within the halftone supercell in the second direction;
receiving data describing a first offset distance through which lines separating adjacent halftone spot cells are inclined between first and second parallel edges of the halftone supercell and a second offset distance through which lines separating adjacent halftone spot cells are inclined between third and fourth edges, perpendicular to the first and second parallel edges, of the halftone supercell;
generating the halftone data placing the three dimensional halftone spot function within each of the halftone spot cells in the halftone supercell; and
printing the halftone data of the image.

13. The method of claim 12, wherein the method additionally comprises displaying text boxes for receiving the data describing numbers of device pixels and offset distances.

14. The method of claim 12, wherein the data describing a three dimensional spot function is generated by a method including: receiving data describing a first line segment extending along a plane; and
generating a three dimensional function forming a portion of the to extend within the halftone spot cell as a surface of revolution about an axis representing the center of the halftone cell, wherein a line extending along the three dimensional function radially in any direction from a center of the halftone spot cell is shaped as the first line segment.

15. The method of claim 12, wherein the data describing a three dimensional spot function is generated by a method including: receiving data describing first and second line segments extending planes;

generating a three dimensional function as a portion of the three dimensional spot function to extend within the halftone spot cell, wherein a first line extending along a first axis of the three dimensional function, through a center of the halftone spot cell in a first direction has a shape of the first line segment, wherein a second line extending along a second axis of the three dimensional function, through the center of the halftone spot cell in a second direction, perpendicular to the first direction, has a shape of the second line segment, and wherein each point of the three dimensional function offset from the second axis through a first distance and offset from the first axis through a second distance has a value of a product of a value of the first line at the second distance from the center of the halftone spot cell and a value of the second line at the first distance from the center of the halftone spot cell.

16. The method of claim 12, wherein the data describing a three dimensional spot function is generated by a method including: for a plurality of contour lines, performing the following steps a) through d):
   a) receiving inputs describing locations of a plurality of control points along a plot area representing the halftone spot cell;
   b) receiving an input describing a location of an area outside the plot area to end a process of receiving inputs describing locations of a plurality of control points;
   c) generating a line segment by interpolating among the plurality of control points; and
   d) receiving an input describing an intensity value to be associated with a contour line including the line segment;
   generating a three dimensional function as a portion of the three dimensional spot function to extend within the halftone spot area by interpolating among the plurality of contour lines.

17. The method of claim 12, additionally comprising delivering the halftone data to a plurality of locations including the printer producing a plurality of alternately inked and blank device pixels.

18. A computer system comprising a display device, a keyboard, a selection device, and a processor programmed to perform a method for generating a halftone pattern to be printed by a printer producing a plurality of alternately inked and blank device pixels, wherein the method determines contours of halftone spots within a plurality of halftone spot cells in a halftone supercell as a function of image intensity information from an image being printed in an area corresponding to the halftone supercell, the halftone supercell is tileable for repeated adjacent placement in a first direction and in a second direction, perpendicular to the first direction, and the method comprises:

receiving data describing a three dimensional halftone spot function having values representing a contour of a halftone spot within each of the halftone spot cells as a function of image intensity information from the image being printed in an area corresponding to the halftone spot cell;

receiving data describing a number of the device pixels extending adjacent one another within the halftone supercell in the first direction and a number of the device pixels extending adjacent one another within the halftone supercell in the second direction;

receiving data describing a number of the halftone spot cells extending adjacent one another within the halftone supercell in the first direction and a number of the halftone spot cells extending adjacent one another within the halftone supercell in the second direction;

receiving data describing a first offset distance through which lines separating adjacent halftone spot cells are inclined between first and second parallel edges of the halftone supercell and a second offset distance through which lines separating adjacent halftone spot cells are inclined between third and fourth edges, perpendicular to the first and second edges, of the halftone supercell;

generating data placing the halftone spot function within each of the halftone spot cells in the halftone supercell; and storing the data placing the halftone spot function within each of the halftone spot cells in the halftone supercell.

19. The computer system of claim 18, wherein the method includes displaying a display screen including at least one text box on the display device and receiving a signal indicating selection of the text box by the selection device before receiving data describing numbers of device pixels and offset distances, and the data describing numbers of device pixels and offset distances is received as signals from the keyboard.

20. The computer system of claim 18, additionally comprising the printer producing a plurality of alternately inked and blank device pixels, wherein the printer prints information according to the halftone pattern as a function of intensity information within an image area corresponding to the halftone pattern.

21. A computer readable medium having computer usable code embodied thereon for generating a three dimensional halftone spot function having values representing a contour of a halftone spot within a halftone spot cell as a function of image intensity information from an image being printed in an area corresponding to the halftone spot cell according to a method comprising:

receiving data describing a first line segment extending along a plane;

generating a three dimensional function to extend within the halftone spot cell as a surface of revolution about an axis representing the center of the halftone cell, wherein a line extending along the three dimensional function radially in any direction from a center of the halftone spot cell is shaped as the first line segment; and storing the three dimensional function as a portion of the halftone spot function.

22. The computer readable medium of claim 21, wherein the data describing a first line segment is generated by a method including:

receiving inputs describing locations of a plurality of control points along a plot area representing a distance within the halftone spot cell from a center of the halftone spot cell in a first direction and a level of image intensity in a second direction, perpendicular to the first direction; and generating a curved line segment by interpolating among the plurality of control points.

23. The computer readable medium of claim 22, wherein receiving inputs describing locations of a plurality of control points is followed by receiving an input describing a location in an area outside the plot area to end a process of receiving inputs describing locations of a plurality of control points.

24. The computer readable medium of claim 21, wherein the data describing a first line segment is read from storage.

25. A computer readable medium having computer usable code embodied thereon for generating a three dimensional halftone spot function having values representing a contour of a halftone spot within a halftone spot cell as a function of image intensity information from an image being printed in an area corresponding to the halftone spot cell according to a method comprising:

receiving data describing first and second line segments extending planes;

generating a three dimensional function to extend within the halftone spot cell, wherein a first line extending along a first axis of the three dimensional function, through a center of the halftone spot cell in a first direction has a shape of the first line segment, wherein a second line extending along a second axis of the three dimensional function, through the center of the halftone spot cell in a second direction, perpendicular to the first direction, has a shape of the second line segment, and wherein each point of the three dimensional function offset from the second axis through a first distance and offset from the first axis through a second distance has a value of a product of a value of the first line at the second distance from the center of the halftone spot cell and a value of the second line at the first distance from the center of the halftone spot cell; and storing the three dimensional function as a portion of the halftone spot function.

26. The computer readable medium of claim 25, wherein the data describing first and second line segments is generated by a method including:

receiving inputs describing locations of a first plurality of control points along a plot area representing a distance within the halftone spot cell through a center of the halftone spot cell in a first direction and a level of image intensity in a second direction, perpendicular to the first direction; and generating a curved line segment by interpolating among the plurality of control points.

27. The computer readable medium of claim 26, wherein receiving inputs describing locations of a plurality of control points is followed by receiving an input describing a location in an area outside the plot area to end a process of receiving inputs describing locations of a plurality of control points.

28. The computer readable medium of claim 27, wherein an additional curved line segment symmetrical to the curved line segment generated by interpolating among the plurality of control points is generated in response to receiving an input describing a location in a predetermined area outside the plot area to end the process of receiving inputs describing locations of a plurality of control points.

29. The computer readable medium of claim 25, wherein the data describing a first line segment is read from storage.

30. A computer readable medium having computer usable code embodied thereon for generating a three dimensional halftone spot function having values representing a contour of a halftone spot within a halftone spot cell as a function of image intensity information from an image being printed in an area corresponding to the halftone spot cell according to a method comprising:

for a plurality of contour lines, performing the following steps a) through d):

a) receiving inputs describing locations of a plurality of control points along a plot area representing the halftone spot cell;

b) receiving an input describing a location of an area outside the plot area to end a process of receiving inputs describing locations of a plurality of control points;

c) generating a line segment by interpolating among the plurality of control points; and d) receiving an input describing an intensity value to be associated with a contour line including the line segment;

generating a three dimensional function to extend within the halftone spot area by interpolating among the plurality of contour lines; and storing the three dimensional function as a portion of the halftone spot function.

31. The computer readable medium of claim 30, wherein, within step c), an additional line segment symmetrical to the line segment generated by interpolation among the plurality of control points is generated in response to determining that the input received in step b) describes a location in a predetermined area outside the plot area.

32. A computer readable medium having computer usable code embodied thereon for generating a halftone pattern to be printed by a printer producing a plurality of alternately inked and blank device pixels according to a method, wherein the method determines contours of halftone spots within a plurality of halftone spot cells in a halftone supercell as a function of image intensity information from an image being printed in an area corresponding to the halftone supercell, the halftone supercell is tileable for repeated adjacent placement in a first direction and in a second direction, perpendicular to the first direction, and the method comprises:

receiving data describing a three dimensional halftone spot function having values representing a contour of a halftone spot within each of the halftone spot cells as a function of image intensity information from the image being printed in an area corresponding to the halftone spot cell;

receiving data describing a number of the device pixels extending adjacent one another within the halftone supercell in the first direction and a number of the device pixels extending adjacent one another within the halftone supercell in the second direction;

receiving data describing a number of the halftone spot cells extending adjacent one another within the halftone supercell in the first direction and a number of the halftone spot cells extending adjacent one another within the halftone supercell in the second direction;

receiving data describing a first offset distance through which lines separating adjacent halftone spot cells are inclined between first and second parallel edges of the halftone supercell and a second offset distance through which lines separating adjacent halftone spot cells are inclined between third and fourth edges, perpendicular to the first and second edges, of the halftone supercell; and generating halftone data placing the halftone spot function within each of the halftone spot cells in the halftone supercell.

33. The computer readable medium of claim 32, wherein the method additionally comprises displaying text boxes for receiving the data describing numbers of device pixels and offset distances.

34. The computer readable medium of claim 32, wherein the data describing a three dimensional spot function is generated by a method including:
  receiving data describing a first line segment extending along a plane; and
  generating a three dimensional function forming a portion of the to extend within the halftone spot cell as a surface of revolution about an axis representing the center of the halftone cell, wherein a line extending along the three dimensional function radially in any direction from a center of the halftone spot cell is shaped as the first line segment.

35. The computer readable medium of claim 32, wherein the data describing a three dimensional spot function is generated by a method including:
  receiving data describing first and second line segments extending planes;
  generating a three dimensional function as a portion of the three dimensional spot function to extend within the halftone spot cell, wherein a first line extending along a first axis of the three dimensional function, through a center of the halftone spot cell in a first direction has a shape of the first line segment, wherein a second line extending along a second axis of the three dimensional function, through the center of the halftone spot cell in a second direction, perpendicular to the first direction, has a shape of the second line segment, and wherein each point of the three dimensional function offset from the second axis through a first distance and offset from the first axis through a second distance has a value of a product of a value of the first line at the second distance from the center of the halftone spot cell and a value of the second line at the first distance from the center of the halftone spot cell.

36. The computer readable medium of claim 32, wherein the data describing a three dimensional spot function is generated by a method including:
  for a plurality of contour lines, performing the following steps a) through d):
    a) receiving inputs describing locations of a plurality of control points along a plot area representing the halftone spot cell;
    b) receiving an input describing a location of an area outside the plot area to end a process of receiving inputs describing locations of a plurality of control points;
    c) generating a line segment by interpolating among the plurality of control points; and
    d) receiving an input describing an intensity value to be associated with a contour line including the line segment;
  generating a three dimensional function as a portion of the three dimensional spot function to extend within the halftone spot area by interpolating among the plurality of contour lines.

* * * * *